United States Patent
Kozakai et al.

(10) Patent No.: US 10,911,076 B2
(45) Date of Patent: Feb. 2, 2021

(54) ANTENNA DEVICE, COMMUNICATION DEVICE, AND COMMUNICATION METHOD

(71) Applicant: SONY SEMICONDUCTOR SOLUTIONS CORPORATION, Kanagawa (JP)

(72) Inventors: Osamu Kozakai, Kanagawa (JP); Hiroyuki Mita, Saitama (JP); Seiji Kobayashi, Kanagawa (JP); Takaaki Hashiguchi, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/463,508

(22) PCT Filed: Nov. 2, 2017

(86) PCT No.: PCT/JP2017/039757
§ 371 (c)(1),
(2) Date: May 23, 2019

(87) PCT Pub. No.: WO2018/123263
PCT Pub. Date: Jul. 5, 2018

(65) Prior Publication Data
US 2019/0379410 A1 Dec. 12, 2019

(30) Foreign Application Priority Data
Dec. 28, 2016 (JP) .................................. 2016-254849

(51) Int. Cl.
*H01Q 1/27* (2006.01)
*H01Q 13/12* (2006.01)
(Continued)

(52) U.S. Cl.
CPC ........... *H04B 1/0346* (2013.01); *H01Q 1/273* (2013.01); *H01Q 1/44* (2013.01); *H01Q 3/24* (2013.01); *H01Q 13/12* (2013.01); *H04W 52/283* (2013.01)

(58) Field of Classification Search
CPC ...... H04B 1/0346; H04B 13/00; H04B 1/034; H01Q 1/273; H01Q 1/44; H01Q 3/24;
(Continued)

(56) References Cited

U.S. PATENT DOCUMENTS 5,572,227 A * 11/1996 Pal .................... H01Q 11/08
343/727
6,577,244 B1 * 6/2003 Clark .................... E21B 47/011
340/854.6
(Continued)

FOREIGN PATENT DOCUMENTS

GB        592760 A * 9/1947 ............... H01Q 9/16
GB        739618 A * 11/1955 ......... H01Q 21/0062
(Continued)

OTHER PUBLICATIONS

Fukasawa, et al. "Evaluation of Guidance System for Visually Disabled",Proceddings of the 14 World Congress on Intelligence Transport Systems (ITS), Oct. 2007, pp. 485-488.
(Continued)

*Primary Examiner* — Pablo N Tran
(74) *Attorney, Agent, or Firm* — Chip Law Group

(57) ABSTRACT

An antenna device, including an antenna element constituted by a conductor, having a tubular shape, and including a long notch section formed to extend in an axial direction in at least a part of a side surface, a capacitor formed to bridge end portions of the notch section in a short direction, substantially at a center of the notch section in a longitudinal direction, and a power feed point formed at a position which
(Continued)

is apart from the capacitor to a side of one end portion of the notch section in the longitudinal direction and corresponds to a side of one end portion of the notch section in the short direction.

4 Claims, 22 Drawing Sheets

(51) Int. Cl.
*H04B 13/00* (2006.01)
*H01Q 1/38* (2006.01)
*H04B 1/034* (2006.01)
*H01Q 1/44* (2006.01)
*H01Q 3/24* (2006.01)
*H04W 52/28* (2009.01)

(58) Field of Classification Search
CPC ............ H01Q 13/12; H01Q 1/04; H01Q 9/16; H01Q 1/27; H01Q 1/50; H01Q 1/38; H04W 52/283; H04W 52/28; G01S 7/02; G01S 13/88; G01V 3/20; H03H 7/38; G01R 33/07
See application file for complete search history.

(56) References Cited

U.S. PATENT DOCUMENTS

| | | | | |
|---|---|---|---|---|
| 7,053,851 B1* | 5/2006 | Bogdans | ................ | H01Q 9/20 343/790 |
| 7,123,200 B1* | 10/2006 | Smith | ...................... | H01Q 1/04 343/709 |
| 8,022,792 B2* | 9/2011 | Howard | ................... | H01P 1/207 333/210 |
| 9,786,990 B2* | 10/2017 | Platt | ......................... | H01Q 1/38 |
| 2004/0145522 A1* | 7/2004 | Wang | ....................... | H01Q 1/38 343/700 MS |
| 2010/0283699 A1* | 11/2010 | Apostolos | ............ | H01Q 1/3275 343/792 |
| 2012/0268337 A1* | 10/2012 | Platt | ........................ | H01Q 1/38 343/795 |
| 2015/0070479 A1 | 3/2015 | Yu | | |
| 2017/0027804 A1 | 2/2017 | Yu | | |
| 2020/0067555 A1* | 2/2020 | Sasaki | .................. | H04B 1/3827 |

FOREIGN PATENT DOCUMENTS

| | | |
|---|---|---|
| JP | 58-054703 A | 3/1983 |
| JP | 03-254209 A | 11/1991 |
| JP | 04-103748 U | 9/1992 |
| JP | 06-037994 U | 5/1994 |
| JP | 06-331736 A | 12/1994 |
| JP | 11-276516 A | 10/1999 |
| JP | 2002-172008 A | 6/2002 |

OTHER PUBLICATIONS

Fukasawa, et al., "Evaluation of Guidance System for Visually Disabled", Information Processing Society of Japan), non-official translation (Proceedings of the 6th Forum on Information Science and Technology), 2007, pp. 485-488.

International Search Report and Written Opinion of PCT Application No. PCT/JP2017/039757, dated Dec. 12, 2017, 10 pages of ISRWO.

* cited by examiner

ANTENNA DEVICE, COMMUNICATION DEVICE, AND COMMUNICATION METHOD

CROSS REFERENCE TO RELATED APPLICATIONS

This application is a U.S. National Phase of International Patent Application No. PCT/JP2017/039757 filed on Nov. 2, 2017, which claims priority benefit of Japanese Patent Application No. JP 2016-254849 filed in the Japan Patent Office on Dec. 28, 2016. Each of the above-referenced applications is hereby incorporated herein by reference in its entirety.

TECHNICAL FIELD

The present disclosure relates to an antenna device, a communication device, and a communication method.

BACKGROUND ART

An elderly person, a sick person, or the like may have an abnormal situation in which a condition of the brain, the heart, or the like suddenly worsens, and in a case in which such an abnormal situation occurs, it may be difficult for the person himself/herself to express the occurrence of the abnormal situation to people around him/her. Assuming such a situation, various types of techniques of monitoring a state of a predetermined target person such as an elderly person, a sick person, or the like, and notifying, in a case in which an abnormal situation occurs with the target person, a person different from the target person of the occurrence of the abnormal situation have been proposed. For example, an example of a technique of notifying, in a case in which an abnormal situation occurs with a target user, the surroundings of the user of the occurrence of the abnormal situation is disclosed in Patent Literature 1.

CITATION LIST

Patent Literature

Patent Literature 1: JP 2002-172008A

DISCLOSURE OF INVENTION

Technical Problem

Further, in recent years, various studies have been conducted on techniques enabling confirmation of a state of a predetermined target person such as an elderly person, a sick person, or the like even at a remote place such as so-called watching or safety confirmation. In particular, a situation in which a target person such as a watching or safety confirmation target moves not only within a predetermined region such as home but also moves to a region other than a predetermined region such as an outdoor place is also assumed, and it is required to implement a technique enabling confirmation of the state of the target person even under such circumstances.

In this regard, the present disclosure proposes a technique enabling confirmation of the state of a target person even in a situation in which the target person moves by constructing an instrument used by the predetermined target person as a communication device.

Solution to Problem

According to the present disclosure, there is provided an antenna device, including: an antenna element constituted by a conductor, having a tubular shape, and including a long notch section formed to extend in an axial direction in at least a part of a side surface; a capacitor formed to bridge end portions of the notch section in a short direction, substantially at a center of the notch section in a longitudinal direction; and a power feed point formed at a position which is apart from the capacitor to a side of one end portion of the notch section in the longitudinal direction and corresponds to a side of one end portion of the notch section in the short direction.

With the antenna device configured as described above, for example, a stick-like instrument such as a staff used by a predetermined target person such as an elderly person or a sick person when going out can be configured as a communication device that transmits and receives information via a wireless communication path. Therefore, various types of information are transmitted to other devices via the wireless communication path by the communication device, and thus it is possible to confirm the state of the other irradiation regardless of the position of the target person.

In addition, according to the present disclosure, there is provided a communication device, including: a housing including a long member in at least a part; an antenna device; and a control unit configured to control an operation related to transmission of a radio signal via the antenna device in accordance with a detection result of a posture of the housing by a predetermined detecting unit.

In addition, according to the present disclosure, there is provided a communication method, including: controlling, in a communication device including a housing including a long member in at least a part and an antenna device, an operation related to transmission of a radio signal in accordance with a detection result of a posture of the housing by a predetermined detecting unit; and transmitting the radio signal via the antenna device.

Advantageous Effects of Invention

As described above, according to the present disclosure, a technique enabling confirmation of the state of a target person even in a situation in which the target person moves by constructing an instrument used by the predetermined target person as a communication device is provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
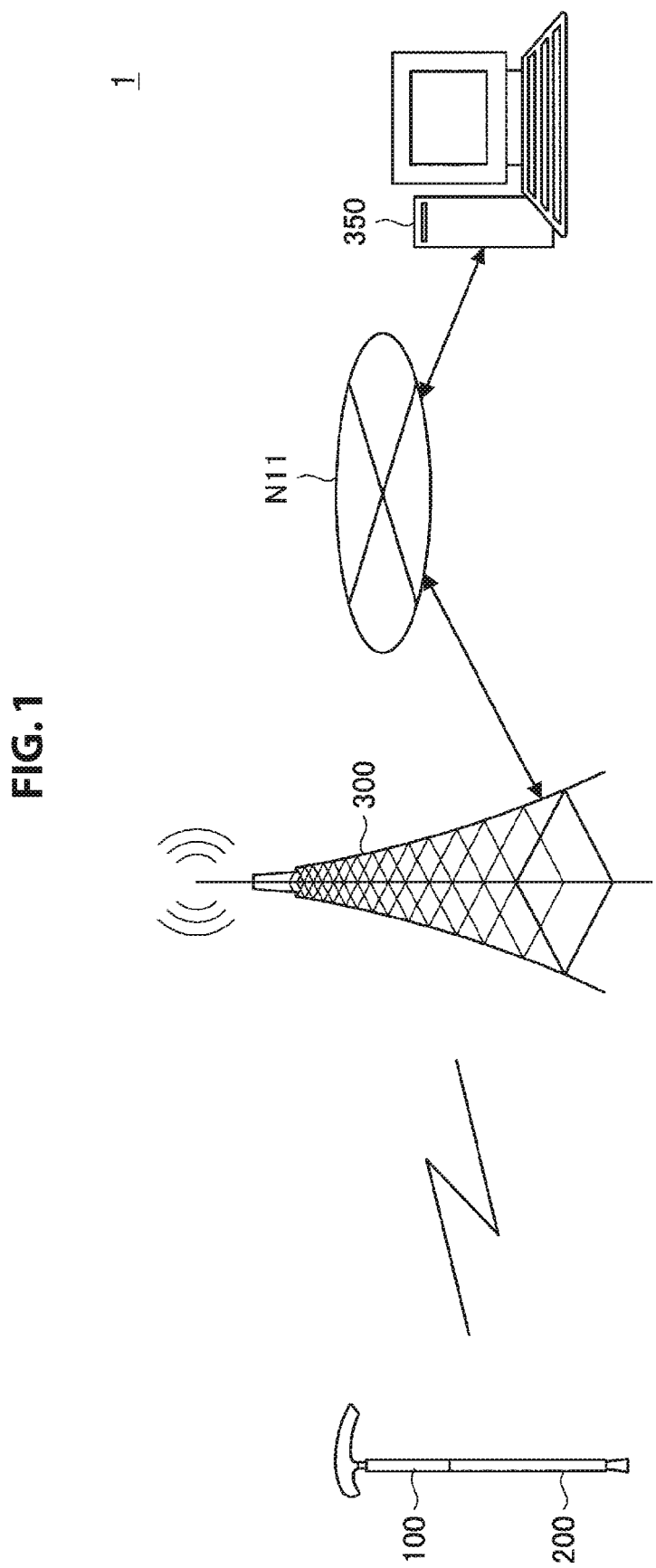
FIG. 1 is an explanatory diagram for describing an example of a schematic configuration of a communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be given in the following order.
1. Schematic configuration
2. First embodiment
2.1. Review of slot antenna
2.2. Configuration of antenna device
2.3. Examples
2.4. Evaluation
3. Second embodiment
3.1. Overview
3.2. Functional configuration
3.3. Process
3.4. Modified examples
3.5. Evaluation
4. Example of hardware configuration
5. Conclusion

1. SCHEMATIC CONFIGURATION

First, an example of a schematic configuration of a communication system according to an embodiment of the present disclosure will be described. A communication system 1 according to the present embodiment provides a mechanism that enables confirmation of a state of a predetermined target person such as an elderly person or a sick person even at a remote place such as so-called watching or safety confirmation.

In a case in which an elderly person, a sick person or the like is a target of state confirmation or monitoring (hereinafter also simply referred to as "confirmation"), a situation in which the target person moves not only with a predetermined region such as a home or a predetermined facility but also moves to a region other than the predetermined region such as an outdoor place is also assumed. In a case in which such a situation is assumed, it may be difficult to confirm the state of the target person using a device installed at a fixed position, for example, a so-called surveillance camera or the like. For this reason, a mechanism for detecting the state of the target person and transmitting a detection result to a predetermined device so that a user of the device (for example, a person related to the target person) can confirm the state of the target person even in the situation in which the target person of the state confirmation moves is required.

In light of such circumstances, in the communication system 1 according to the present embodiment, an instrument that is a stick-like object such as a cane used by an elderly person or a sick person when going out is constructed as a communication device 200 capable of performing communication with other devices, so that it is possible to confirm the state of the target person regardless of the position of the target person. For example, FIG. 1 is an explanatory diagram for describing an example of a schematic configuration of the communication system according to the present embodiment.

As illustrated in FIG. 1, the communication system 1 according to the present embodiment includes, for example, a communication device 200, a base station 300, and an information processing device 350.

The base station 300 is, for example, a base station of a cellular system (or a mobile communication system). The base station 300 performs wireless communication with a device (for example, the communication device 200) located within a predetermined communication range (for example, a cell). Further, as another example, the base station 300 may be a device operating as an access point of wireless communication based on a predetermined standard such as so-called Wi-Fi (registered trademark) or the like. Further, the base station 300 may be connected to other base stations 300 or a communication device via a wired or wireless network N11. On the basis of such a configuration, for example, the base station 300 may transmit data received from the communication device 200 via a wireless communication path to another device (for example, the information processing device 350) via the network N11.

The communication device 200 includes an antenna device 100 that performs wireless communication for a stick-like instrument such as a cane, a circuit that controls communication via the antenna device 100, and the like. On the basis of such a configuration, the communication device 200 may estimate the state of the target person, for example, in accordance with its own state and transmit various types of information on the basis of an estimation result to the information processing device 350 via a predetermined network including a wireless communication path. With such a configuration, for example, even in a situation in which a predetermined target person arbitrarily moves, information is transmitted from the communication device 200 from the information processing device 350 regardless of the position of the target person, and thus the user of the information processing device 350 can confirm the state of the target person.

Figure 2:
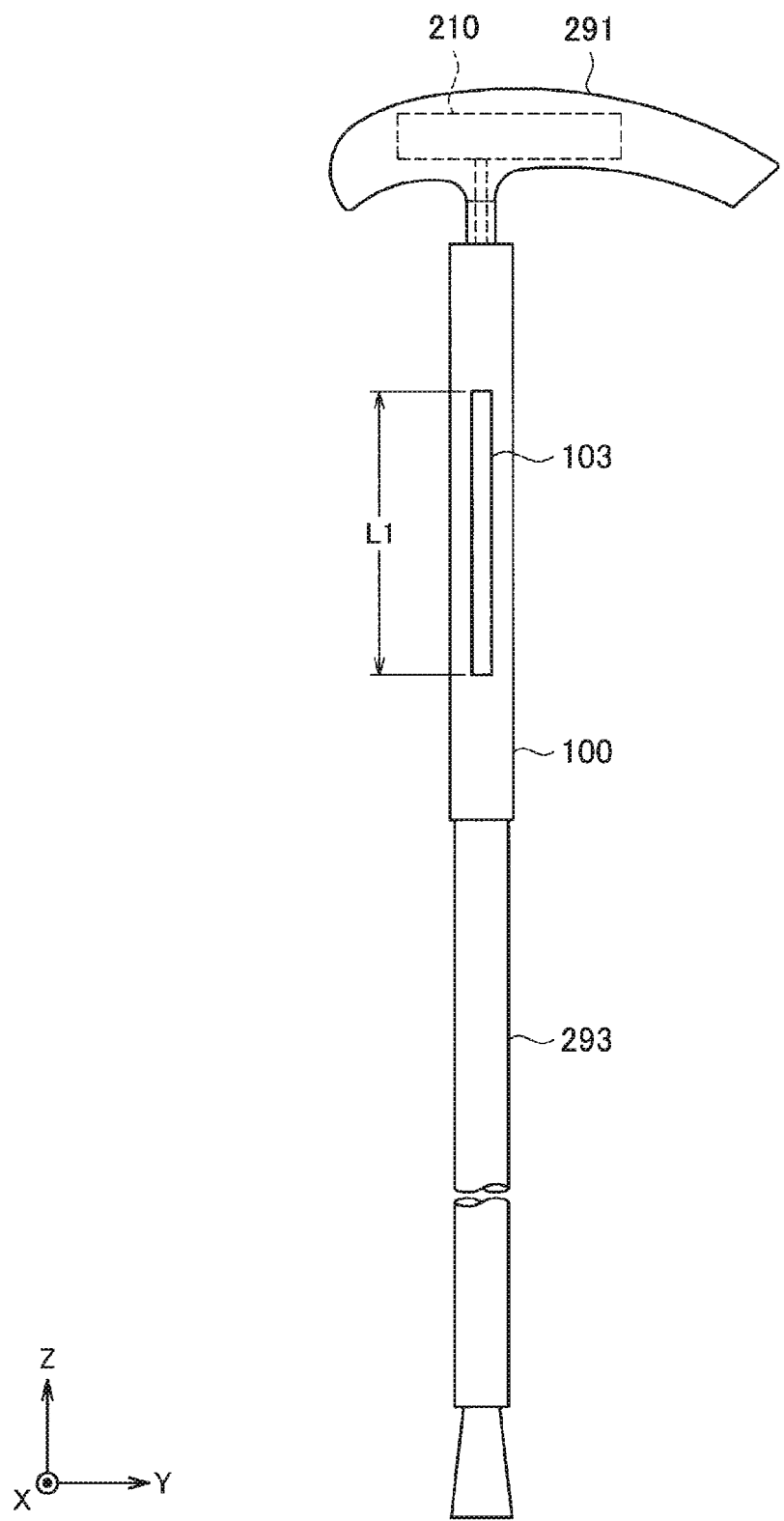
FIG. 2 is an explanatory diagram for describing an example of a schematic configuration of a communication device according to the embodiment.

Next, an example of a schematic configuration of the communication device 200 according to the present embodiment will be described with reference to FIG. 2, particularly, with an example in a case in which the communication device 200 is configured to function as a so-called cane. FIG. 2 is an explanatory diagram for describing an example of a schematic configuration of the communication device 200 according to the present embodiment. Further, in the example illustrated in FIG. 2, a vertical direction, a horizontal direction, and a depth direction in the drawing are a z direction, a y direction, and an x direction, respectively.

As illustrated in FIG. 2, the communication device 200 includes a grip section 291, a shaft section 293, an antenna device 100, and a circuit unit 210.

The shaft section 293 corresponds to a shaft part of the cane. The shaft section 293 is configured, for example, in an elongated shape. As a more specific example, the shaft section 293 may be formed in an elongated cylindrical shape. The grip section 291 is formed on the side of one end portion of the shaft section 293 in the longitudinal direction. Further, as illustrated in FIG. 2, the antenna device 100 may be formed between the shaft section 293 and the grip section 291. Further, as another example, at least a part of the shaft section 293 may be configured as the antenna device 100. In this case, for example, a part of the shaft section 293 positioned near the grip section 291 may be configured as the antenna device 100. Further, the entire shaft section 293 may be configured as the antenna device 100.

Further, the shaft section 293 may be configured such that a portion in which the antenna device 100 is not formed can be folded. As another example, the shaft section 293 may be configured to be extendable and retractable such that a part of the portion in which the antenna device 100 is not formed is accommodated in another part. Further, the portion of the shaft section 293 in which the antenna device 100 is not formed may be formed using a material having conductivity or may be formed using a non-conductive material.

Figure 3:
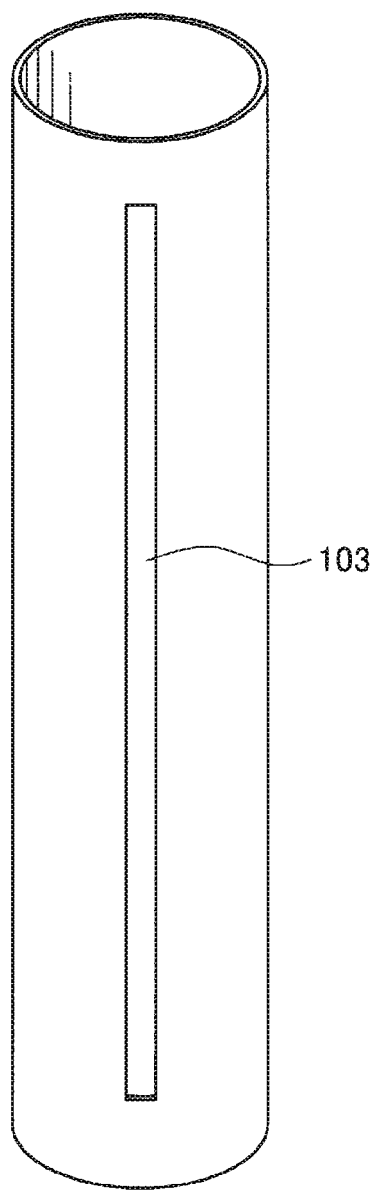
FIG. 3 is an explanatory diagram for describing an example of a configuration of an antenna device applied to the communication device illustrated in FIG. 2.

The antenna device 100 is configured as a so-called slot antenna. For example, FIG. 3 is an explanatory diagram for describing an example of a configuration of the antenna device 100 applied to the communication device 200 illustrated in FIG. 2. Specifically, the antenna device 100 is formed using a material having conductivity and has a tubular shape. For example, in the example illustrated in FIG. 3, the antenna device 100 has an elongated cylindrical shape. Further, as illustrated in FIGS. 2 and 3, a long notch section 103 extending in an axial direction of a cylinder (for example, a direction corresponding to the z direction in FIG. 2, that is, a direction in which the antenna device 100 of the cylindrical shape extends) is formed in at least a part of the side surface of the antenna device 100. A length L11 of the notch section 103 in the longitudinal direction is decided in accordance with, for example, a length substantially equal to an integral multiple of a half wavelength of a radio signal (radio waves) transmitted and received via the antenna device 100. Further, the notch section 103 may be filled with a non-conductive material.

Further, the antenna device 100 may be configured to be attachable to and detachable from the communication device 200. As a specific example, the antenna device 100 may include a configuration for fixing the shaft section 293 or the grip section 291 near the end portion in the vicinity of both end portions in the longitudinal direction.

Further, the antenna device 100 may include the notch section 103, and the side surface may be covered with a cover or the like. In this case, for example, a member for affixing the cover may be formed on the side surface of the antenna device 100.

The grip section 291 corresponds to a part which the user (for example, the target person) grips to hold the communication device 200 configured as the cane. The circuit unit 210 is installed in at least part of the grip section 291. For example, in the example illustrated in FIG. 2, the circuit unit 210 is installed inside the grip section 291.

The circuit unit 210 includes various sensors for detecting a predetermined state or situation, a communication device that enables the communication device 200 to perform transmission and reception with other devices via a wireless communication path, and the like. The circuit unit 210 and the antenna device 100 are electrically connected to each other, for example, via a conductive material, a wiring, or the like.

On the basis of such a configuration, the communication device 200 according to the present embodiment communicates with other devices via the wireless communication path. Specifically, the antenna device 100 radiates an electric signal output from the communication device installed in the circuit unit 210 into a space as radio waves. Accordingly, information (data) is transmitted from the communication device 200 to other devices via the wireless communication path. Further, the antenna device 100 converts radio waves in the space into an electric signal and outputs the electric signal to the communication device installed in the circuit unit 210. With such a configuration, the communication device 200 can receive information (data) transmitted from other devices via the wireless communication path.

The example of the schematic configuration of the communication system according to an embodiment of the present disclosure has been described above with reference to FIGS. 1 to 3. Further, examples of a more detailed configuration of the communication system according to the present embodiment will be described below as embodiments.

2. FIRST EMBODIMENT

As a first embodiment of the present disclosure, an example of a more detailed configuration of the antenna device 100 applicable to the communication device 200 according to the present disclosure will be described. Further, in the present embodiment, an example in which the antenna device 100 is configured as a so-called slot antenna will be described.

2.1. REVIEW OF SLOT ANTENNA

First, in order to facilitate understanding of features of the antenna device 100 according to the present embodiment, an example of a configuration of a so-called slot antenna will be described as a comparative example, and then the problems of the antenna device 100 according to the present embodiment will be described.

Figure 4:
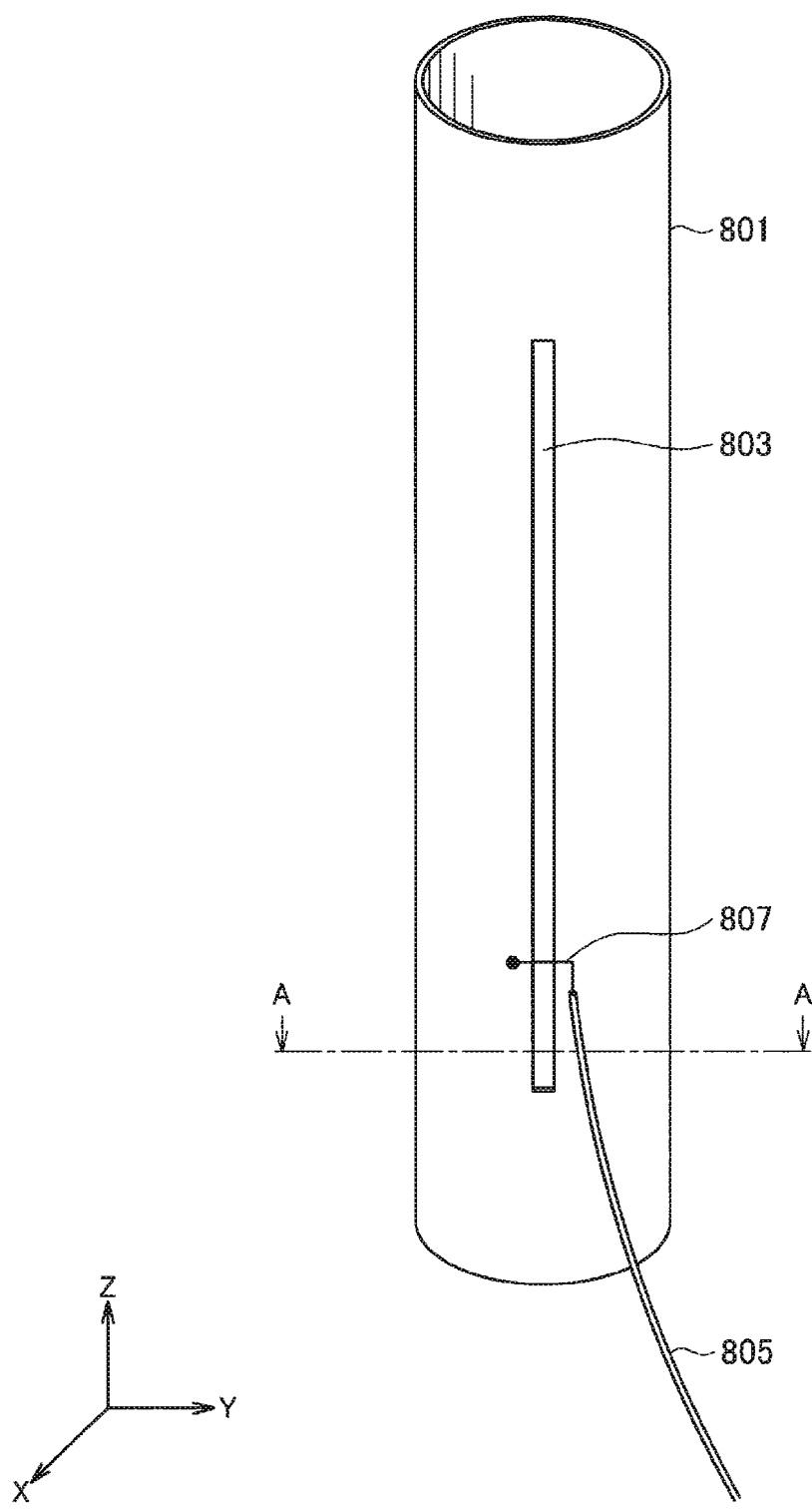
FIG. 4 is a perspective view illustrating an example of a schematic configuration of an antenna device according to a comparative example.
Figure 5:
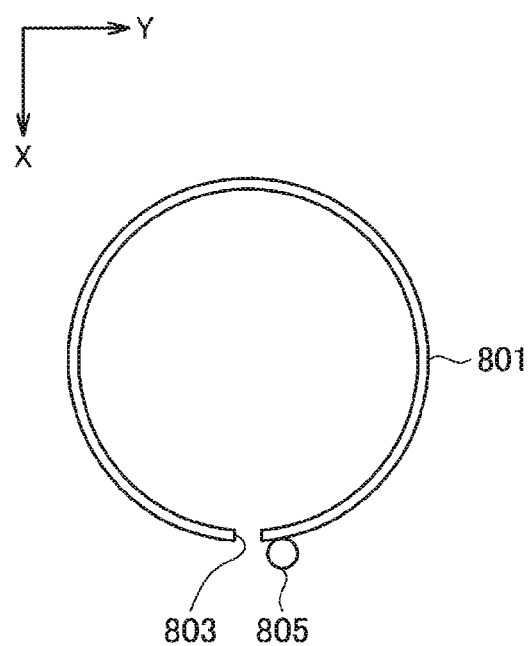
FIG. 5 is a schematic cross-sectional view in a case in which the antenna device illustrated in FIG. 4 is cut along a plane perpendicular to a z direction including a line A-A'.

For example, FIGS. 4 and 5 are explanatory diagrams for describing an example of a configuration of an antenna device 800 according to a comparative example. Specifically, FIG. 4 is a perspective view illustrating an example of a schematic configuration of the antenna device 800 according to the comparative example. Further, in the example illustrated in FIG. 4, the x direction and the y direction are plane directions of a horizontal plane, and the z direction is a direction perpendicular to the horizontal plane (that is, a vertical direction). Further, FIG. 5 is a schematic cross-sectional view in a case in which the antenna device 800 illustrated in FIG. 4 is cut along a plane perpendicular to the z direction including the line A-A'.

As illustrated in FIG. 4, the antenna device 800 according to the comparative example includes an antenna element 801 and a power feed line 805. The antenna element 801 has an elongated cylindrical shape, and a long notch section 803 extending in an axial direction of a cylinder (for example, a direction corresponding to the z direction in FIG. 4, that is, a direction in which the antenna element 801 of the cylindrical shape extends) is formed in the side surface.

Further, as illustrated in FIGS. 4 and 5, the antenna element 801 has a position which is near one end portion out of the end portions of the notch section 803 in the longitudinal direction and corresponds to the side of one end portion of the notch section 803 in the short direction as a power feed point 807, and the power feed line 805 is electrically connected to the power feed point 807. Further, in the antenna device 800, impedance matching with the power feed line 805 is achieved by performing offset feeding from the center of the notch section 803 in the longitudinal direction. In other words, the position of the power feed point 807 is decided so that it matches characteristic impedance of a system. Further, in a device related to wireless communication, for example, the characteristic impedance is set to 50Ω, and in this case, in the antenna device 800, the position of the power feed point 807 is decided so that it matches 50Ω.

The example of the configuration of the antenna device 800 according to the comparative example has been described above with reference to FIGS. 4 and 5.

Further, a frequency of the radio signal transmitted and received by the antenna device 800 depends on a diameter of the antenna element 801 configured as a hollow conductor and a length of the slot (the notch section 803) formed in the antenna element 801. Specifically, even in a case in which a radio signal of a predetermined frequency is transmitted and received, as the diameter of the hollow conductor decreases, a longer slot tends to be required. Further, because of a characteristic that the frequency of the radio signal to be transmitted and received is decided in accordance with the length of the slot, in the antenna device 800 according to the comparative example, in a case in which a radio signal is transmitted and received using a plurality of frequencies selectively (dual resonance is performed), it is necessary to form a plurality of slots (notch section 803) in the antenna element 801.

On the other hand, in a case in which the notch section 803 is formed in the antenna element 801, the strength of the portion of the antenna element 801 in which the notch section 803 is formed decreases. In other words, as the length of the notch section 803 increases, the strength of the antenna element 801 decreases. Further, as the number of notch sections 803 increases, the strength of the antenna element 801 decreases.

On the other hand, for example, a technique in which capacitive plates are formed all along a slot in a longitudinal direction, or a dielectric is attached between opposite capacitive plates, so that a length of the slot is reduced is disclosed in JP 10-56321A. However, in such a configuration, it can be assumed that a manufacturing process of an antenna element becomes more complicated since it is necessary to closely adhere a relatively large dielectric to the slot, and it is necessary to construct the capacitive plate. Further, in this configuration, since a single slot is formed, it is also difficult to perform transmission and reception of a radio signal using a plurality of frequencies selectively.

Further, as another example, a technique of reducing a slot length by adding a non-powered slot is disclosed in JP 2001-299950A. However, in such a configuration, it is necessary to form an additional slot. In other words, even in a case in which the length of the slot becomes short, the number of slots increases, and thus the strength of the antenna element decreases. Further, since it is necessary to form an additional slot (in particular, a slot not used for transmission of a radio signal) when the antenna element is processed, it can be assumed that the manufacturing process of the antenna element becomes more complicated.

Here, as described with reference to FIGS. 2 and 3, in a case in which the antenna device is configured as a part of a stick-like object such as a so-called cane or the like, the antenna device is required to have strength corresponding to the intended use of the stick-like object. Therefore, in a case in which the antenna device configured as the slot antenna in the communication device 200 illustrated in FIGS. 2 and 3 is configured as a part of the stick-like object such as the cane, for example, a mechanism for further reducing the length of the slot and the number of slots (that is, notches) is required in order to secure the strength corresponding to the intended use.

In light of the above circumstances, in the present embodiment, an example of an antenna device configured as a slot antenna having excellent communication characteristics while securing the strength corresponding to the intended use of the stick-like object such as the cane by further reducing the length of the slot and the number of the slots is proposed. In this regard, hereinafter, an antenna device according to the present embodiment will be described in further detail.

2.2. CONFIGURATION OF ANTENNA DEVICE

Figure 6:
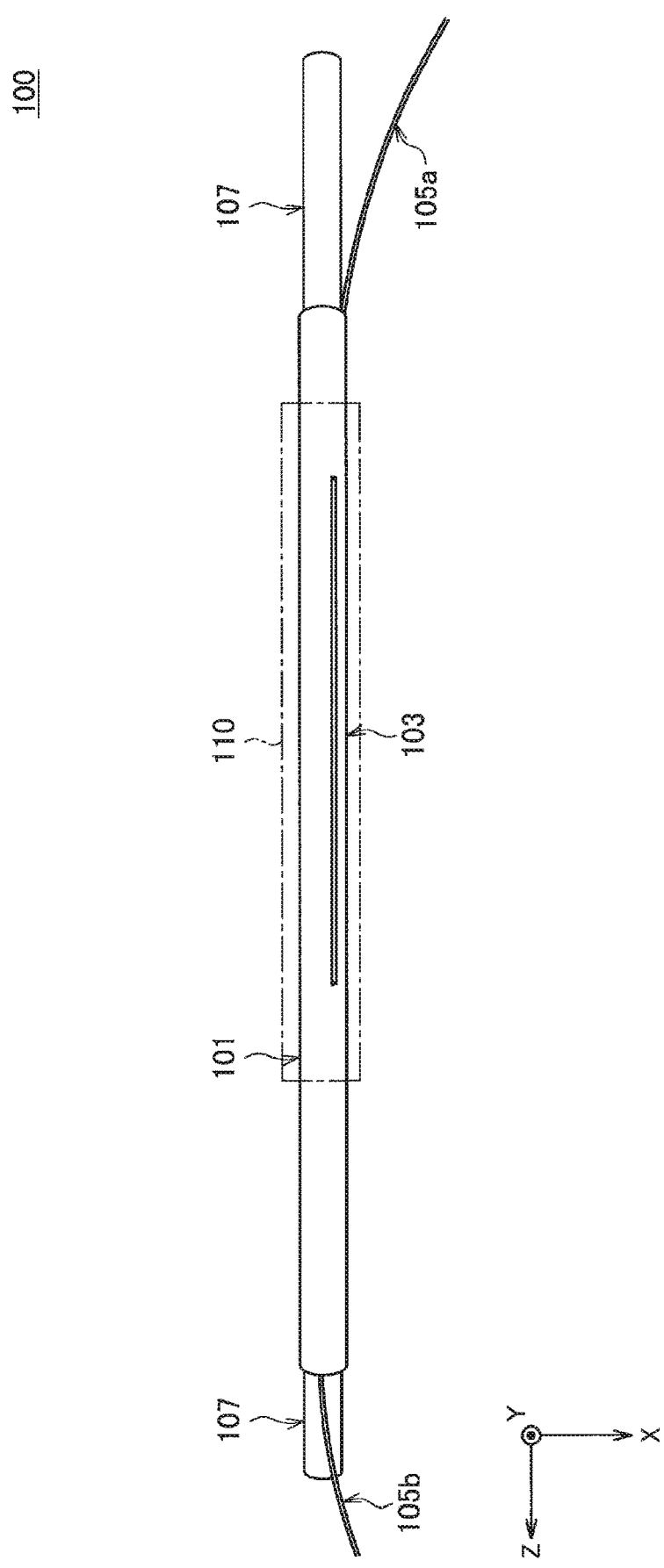
FIG. 6 is an explanatory diagram for describing an example of a configuration of an antenna device according to a first embodiment of the present disclosure.
Figure 7:
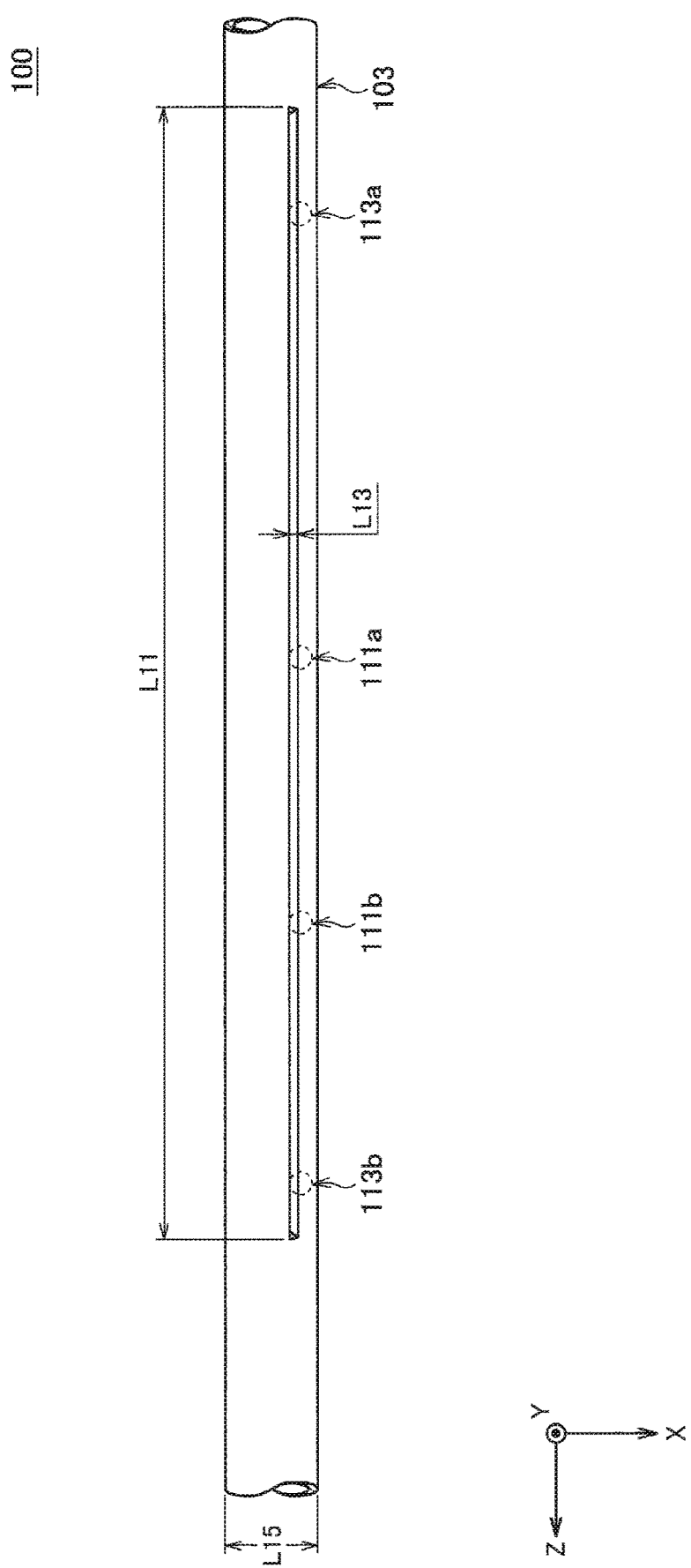
FIG. 7 is an enlarged schematic view of a part of FIG. 6.

First, an example of a configuration of an antenna device according to the present embodiment, particularly, a configuration of the antenna device 100 applicable to the communication device 200 illustrated in FIGS. 2 and 3 will be described with reference to FIG. 6 and FIG. 7. FIG. 6 is an explanatory diagram for describing an example of a configuration of an antenna device according to the present embodiment. Further, FIG. 7 is a schematic enlarged view of a part of FIG. 6 and is an enlarged view of a part indicated by reference numeral 110. Further, an x direction, a y direction, and a z direction in FIGS. 6 and 7 correspond to the x direction, the y direction, and the z direction in FIG. 2, respectively. Further, in the present description, the antenna device 100 according to the present embodiment is configured as an antenna device capable of transmitting and receiving a radio signal using selectively two frequencies (that is, a dual resonant antenna device) will be described below.

As illustrated in FIG. 6, the antenna device 100 according to the present embodiment includes an antenna element 101 and power feed lines 105a and 105b. The antenna element 101 has an elongated cylindrical shape, and a long notch section 103 extending in an axial direction of a cylinder (that is, a direction corresponding to the z direction in FIGS. 6 and 7, that is, a direction in which the cylindrical antenna element 101 is extended) is formed in the side surface. Further, the antenna element 101 is configured using a material having conductivity. As a more specific example, it is desirable that the antenna element 101 be configured using a lightweight material having conductivity such as aluminum. Further, in FIG. 7, reference numeral L11 indicates the length of the notch section 103 in the longitudinal direction, and reference numeral L13 indicates the width of the notch section 103 in the short direction. Further, reference numeral L15 indicates the diameter of the antenna element 101.

As illustrated in FIG. 7, in the antenna element 101, a power feed point 113a corresponding to a first frequency out of two frequencies is formed at a position which is near one end portion out of end portions of the notch section 103 in the longitudinal direction and corresponds to the side of one end portion of the notch section 103 in the short direction. Here, the first frequency corresponds to a frequency in a case in which the antenna device 100 is operated in a basic mode. Further, a second frequency different from the first frequency out of the two frequencies corresponds to a frequency in a case in which the antenna device 100 is operated in a high-order mode. Further, a power feed line 105a for supplying high frequency power is electrically connected to the power feed point 113a in order to transmit and receive a radio signal (radio wave) of the first frequency. Further, a capacitor 111a having a predetermined capacitance is loaded so as to bridge the end portions of the notch section 103 in the short direction substantially at the center of the notch section 103 in the longitudinal direction.

Here, a resonance frequency of the antenna device 100 in the case of transmitting and receiving the radio signal of the first frequency is decided in accordance with the length L11 of the notch section 103 in the longitudinal direction and the capacitance of the capacitor 111a. Specifically, in a case in which the capacitor 111a is not loaded, the length L11 of the notch section 103 corresponds to an electrical length of a half wavelength of the resonance frequency in the case of transmitting and receiving the radio signal of the first frequency. On the basis of such a premise, the capacitor 111a is loaded, and thus it is possible to reduce the length L11 of the notch section 103 to be shorter than that in a case in which the capacitor 111a is not loaded.

Further, in a case in which a radio signal is transmitted and received at the first frequency, since the antenna device 100 operates in the basic mode, an electric current becomes maximum near the end portion of the notch section 103 in the longitudinal direction, and a voltage becomes maximum substantially at the center. In other words, as the capacitor 111a is installed substantially at the center of the notch section 103 in the longitudinal direction, it is possible to cause the capacitor 111a to efficiently function. Therefore, with such a configuration, it is possible to transmit and receive the radio signal at the first frequency and to reduce the length L11 of the notch section 103 in the longitudinal direction without installing the capacitor over the entire notch section 103.

Further, in the antenna device 100, the impedance matching with the power feed line 105a is decided in accordance with the position of the power feed point 113a in the longitudinal direction of the notch section 103. In other words, the position of the power feed point 113a is decided so that it match with the characteristic impedance of the system in a case in which the radio signal of the first frequency is transmitted and received. As a more specific example, the position of the power feed point 113a may be decided so that it matches with 50Ω which is commonly set as the characteristic impedance in devices related to radio signals.

Further, as described above, the antenna device 100 according to the present embodiment can operate in the high-order mode and transmit and receive the radio signal (radio waves) of the second frequency. In this regard, components contributing to the transmission/reception of the radio signal of the second frequency in the configuration of the antenna device 100 will be described below.

In the antenna element 101, a power feed point 113b corresponding to the second frequency is formed at a position which is near one end portion out of end portions of the notch section 103 in the longitudinal direction and corresponds to the side of one end portion of the notch section 103 in the short direction. For example, in the example illustrated in FIG. 7, the power feed point 113b is formed in the vicinity of the end portion opposite to the end portion in which the power feed point 113a is formed out of the end portions of the notch section 103 in the longitudinal direction. Further, a power feed line 105b for supplying high frequency power is electrically connected to the power feed point 113b in order to transmit/receive the radio signal (radio wave) of the second frequency. Further, a capacitor 111b is loaded at a position which is apart by substantially ¼ of the length L11 of the notch section 103 from the end portion on the side on which the power feed point 113b is installed out of the end portions of the notch section 103 in the longitudinal direction toward the center in the longitudinal direction. In other words, the capacitor 111b is loaded at a position corresponding to substantially the center between the position at which the capacitor 111a is formed and the end portion on the side on which the power feed point 113b is formed out of the end portions of the notch section 103 in the longitudinal direction.

Further, a resonance frequency of the antenna device 100 in the case of transmitting and receiving the radio signal of the second frequency is decided in accordance with the length L11 of the notch section 103 in the longitudinal direction and the capacitance of the capacitor 111b, similar to the case of the first frequency.

Further, in a case in which the radio signal is transmitted and received at the second frequency, since the antenna device 100 operates in the high-order mode, the electric current becomes maximum in the vicinity of the end portion of the notch section 103 in the longitudinal direction and in the vicinity of the center, and the voltage becomes maximum at a position which is apart by substantially ¼ of the length L11 from the end portion of the notch section 103 in the longitudinal direction toward the center in the longitudinal direction. In other words, since the capacitor 111b is formed at a position which is apart by substantially ¼ of the length L11 of the notch section 103 from the end portion of the notch section 103 in the longitudinal direction toward the center in the longitudinal direction, it is possible to cause the capacitor 111b to function efficiently. Therefore, with such a configuration, it is possible to transmit and receive the radio signal at the second frequency and reduce the length L11 of the notch section 103 in the longitudinal direction without installing the capacitor over the entire notch section 103.

Further, in the antenna device 100, the impedance matching with the power feed line 105b is decided in accordance with the position of the power feed point 113b in the longitudinal direction of the notch section 103. In other words, the position of the power feed point 113b is decided so that it matches with the characteristic impedance of the system in the case of transmitting and receiving the radio signal of the second frequency. As a more specific example, the position of the power feed point 113b may be decided so that it matches 50Ω which is commonly set as the characteristic impedance in devices related to radio signals.

Further, as illustrated in FIG. 6, a support member 107 for supporting the power feed lines 105a and 105b may be formed in the vicinity of the end portion of the antenna element 101 in the longitudinal direction. For example, in the example illustrated in FIG. 6, the inside of the antenna element 101 near the end portion of the antenna element 101 in the longitudinal direction is filled with a foaming agent as the support member 107.

As described above, the antenna device 100 according to the present embodiment is configured as a so-called slot antenna having an elongated cylindrical shape and having a long slot (notch section 103) extending in the axial direction of the cylinder. Further, in the antenna device 100 according to the present embodiment, the capacitor 111a having a desired capacitance is loaded substantially in the middle of the notch section 103 in the longitudinal direction, and thus it is possible to easily adjust the resonance frequency (that is, the first frequency) in a case in which the antenna device 100 operates in the basic mode. Further, in a case in which the antenna device 100 operates in the basic mode, since the capacitor 111a is installed at the position in which the voltage becomes maximum, it is possible to reduce the length L11 of the notch section 103 in the longitudinal direction without installing the capacitor over the entire notch section 103.

Further, the antenna device 100 according to the present embodiment can operate in the high-order mode and transmit and receive the radio signal of a second frequency different from the first frequency. In this case, in the antenna device 100 according to the present embodiment, the capacitor 111b is loaded at a position which is apart by substantially ¼ of the length L11 of the notch section 103 from the end portion of the notch section 103 in the longitudinal direction toward the center in the longitudinal direction. On the basis of such a configuration, according to the antenna device 100 of the present embodiment, as a capacitor having a desired capacitance is loaded as the capacitor 111b, it is possible to easily adjust the resonance frequency (that is, the second frequency) in a case in which the antenna device 100 operates in the high-order mode. Further, in a case in which the antenna device 100 operates in the high-order mode, as the capacitor 111b is positioned at the position in which the voltage becomes maximum, it is possible to reduce the length L11 of the notch section 103 in the longitudinal direction without installing the capacitor over the entire notch section 103.

Further, the configuration of the antenna device 100 according to the present embodiment described above is merely an example, and is not necessarily limited to the configuration described above. For example, both the power feed points 113a and 113b may be formed on any one side of the end portions of the notch section 103 in the longitudinal direction. Further, as another example, the antenna device 100 according to the present embodiment can support only a single frequency. In this case, it is desirable that either the power feed line 105a, the power feed point 113a, and the capacitor 111a or the power feed line 105b, the power feed point 113b, and the capacitor 111b illustrated in FIGS. 6 and 7 be formed.

The example of the configuration of the antenna device according to the present embodiment, particularly, the configuration of the antenna device 100 applicable to the communication device 200 illustrated in FIGS. 2 and 3 has been described above with reference to FIGS. 6 and 7.

2.3. EXAMPLES

Next, an example of the antenna device 100 according to the present embodiment will be described. Further, in the present example, an example of an antenna characteristic in a case in which the antenna device 100 according to the present embodiment is configured to perform the dual resonance as illustrated in FIGS. 6 and 7 will be described.

Specifically, in the antenna device 100 according to the present example, as the antenna element 101, an elongated cylindrical aluminum pipe formed with a diameter of 20 mm (that is, a diameter L15 illustrated in FIG. 7) was applied. Further, a notch section 103 in which the length in the longitudinal direction (the length L11 illustrated in FIG. 7) is 240 mm, and the width in the short direction (that is, the width L13 illustrated in FIG. 7) is 1 mm is formed in the side surface of the antenna element 101.

Further, in the present example, the frequency (that is, the first frequency) in a case in which it operates in the basic mode is set to 925 MHz. Further, the frequency (that is, the second frequency) in a case in which it operates in the high-order mode is set to 1575 MHz under the assumption of the use in a so-called global navigation satellite system (GNSS) band. Further, a capacitor having a capacitance C=3 pF is used as the capacitor 111a corresponding to the first frequency, and a capacitor having a capacitance C=0.7 pF is used as the capacitor 111b corresponding to the second frequency. Further, the position of the power feed point 113a is adjusted so that the characteristic impedance of the system matches with 50Ω when it operates in the basic mode. Similarly, the position of the power feed point 113b is adjusted so that the characteristic impedance of the system matches with 50Ω when it operates in the high-order mode.

Figure 8:
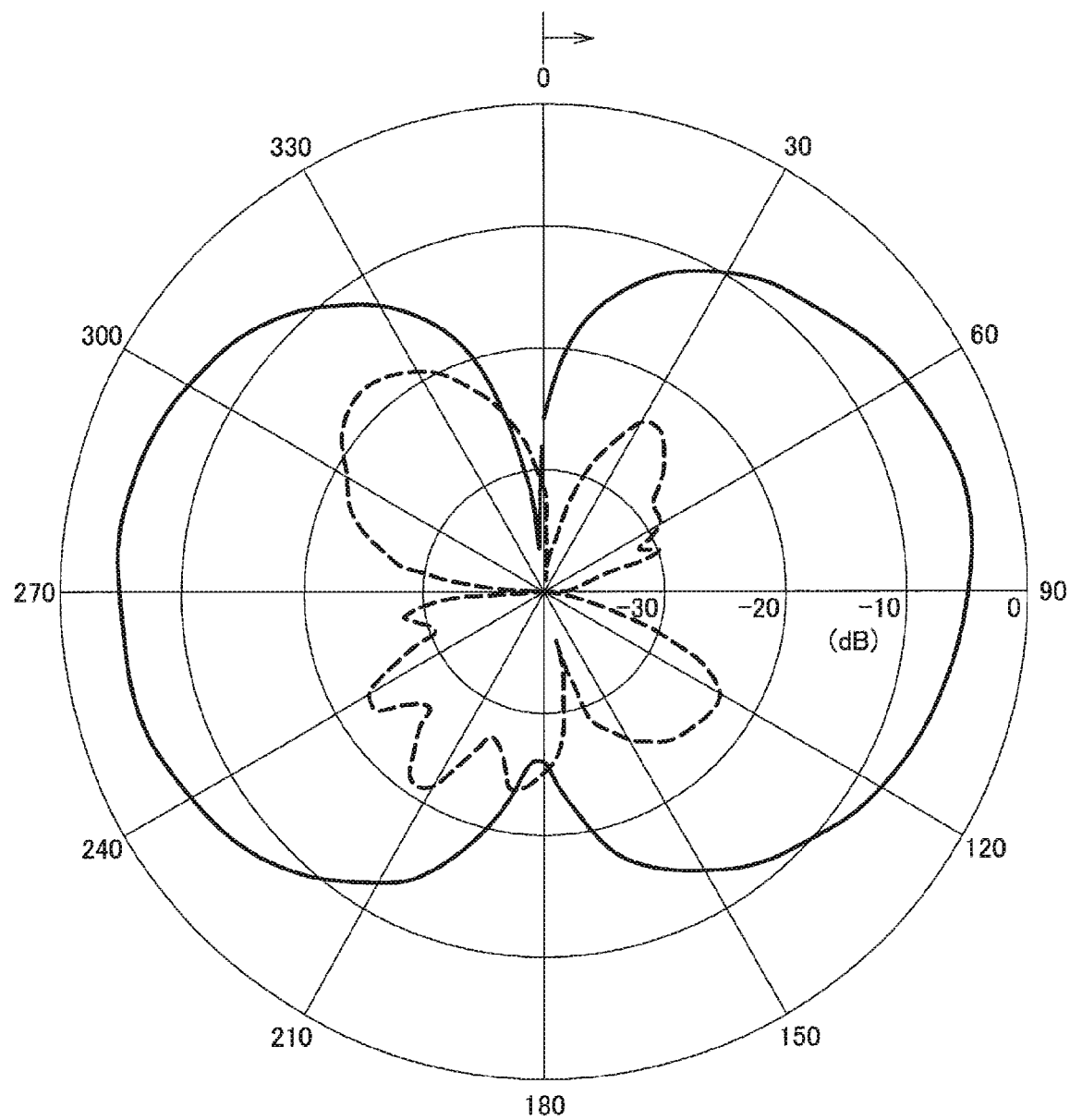
FIG. 8 is a diagram illustrating an example of a radiation characteristic of an antenna device according to an example of the embodiment.
Figure 9:
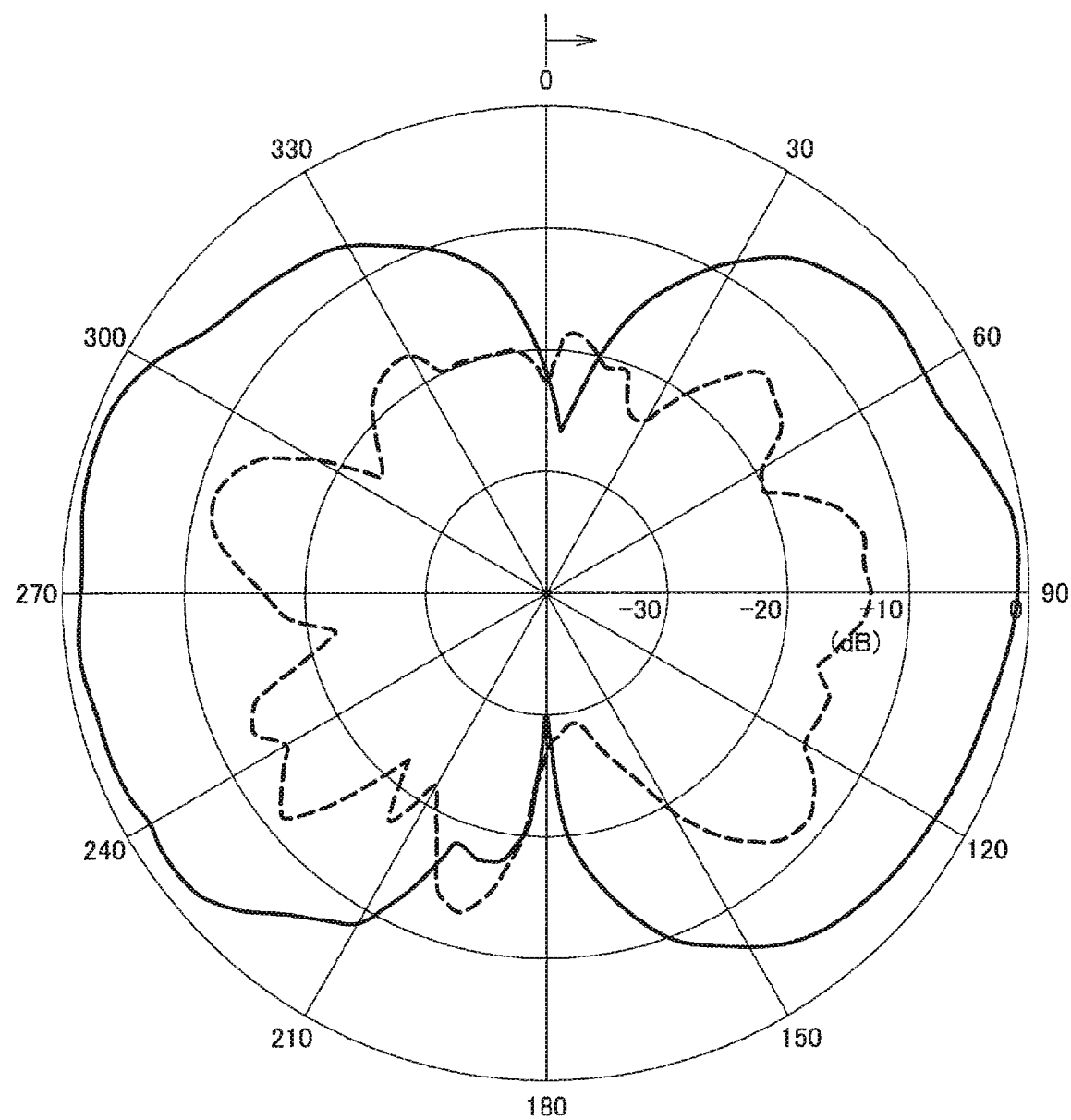
FIG. 9 is a diagram illustrating another example of a radiation characteristic of an antenna device according to an example of the embodiment.

For example, FIG. 8 is a diagram illustrating an example of a radiation characteristic of the antenna device 100 according to an example of the present embodiment and illustrates an example in a case in which the antenna device 100 is operated in the basic mode (that is, in a case in which the radio signal of 925 MHz is transmitted). Further, FIG. 9 is a diagram illustrating another example of the radiation characteristic of the antenna device 100 according to an example of the present embodiment and illustrates an example in a case in which the antenna device 100 is operated in the high-order mode (that is, in a case in which the radio of 1575 MHz signal is transmitted). As illustrated in FIGS. 8 and 9, in a case in which the radio signals are transmitted at 925 MHz and 1575 MHz, excellent radiation characteristics are obtained in both cases.

Figure 10:
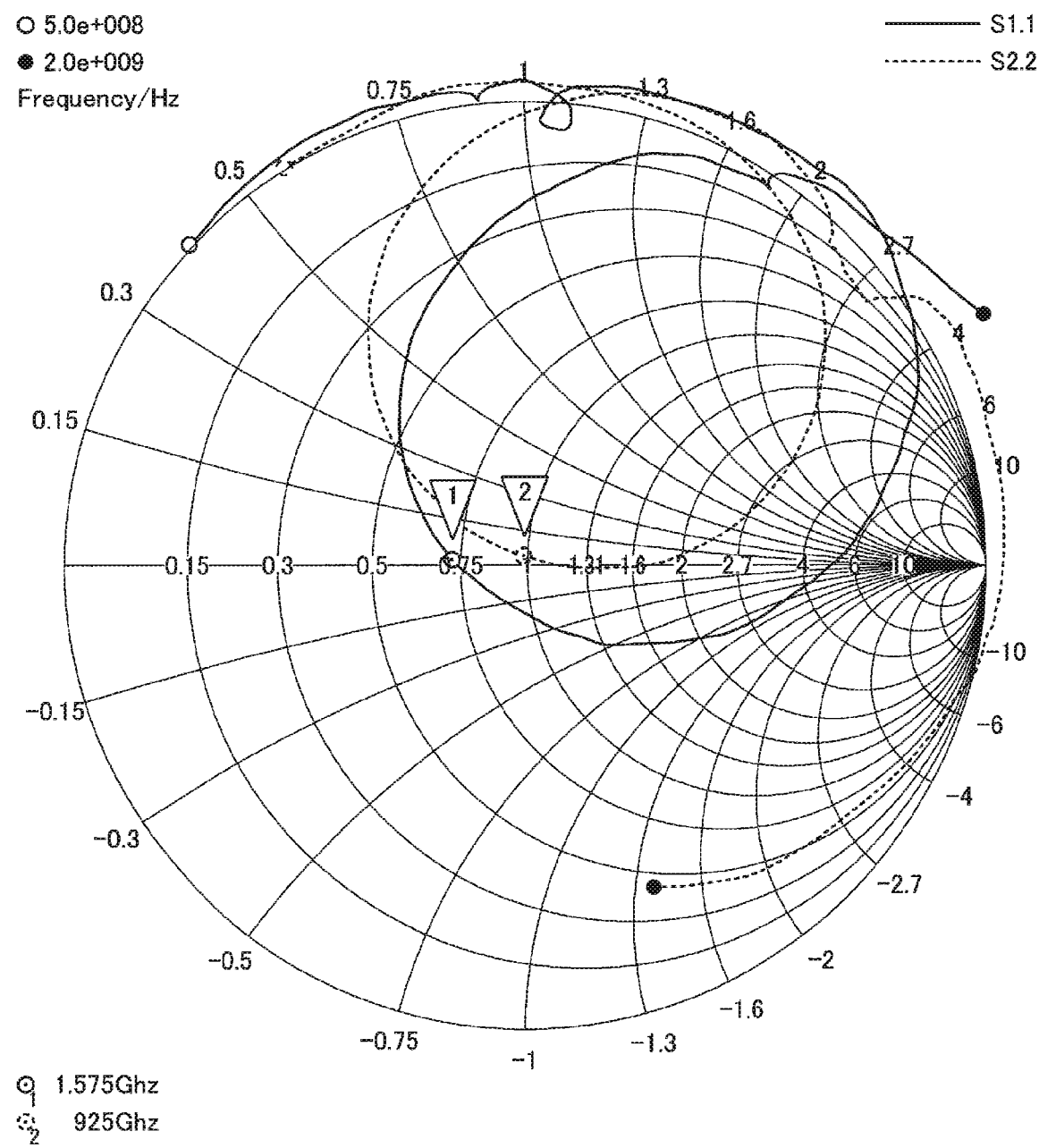
FIG. 10 is a diagram illustrating an example of an antenna characteristic of an antenna device according to an example of the embodiment.
Figure 11:
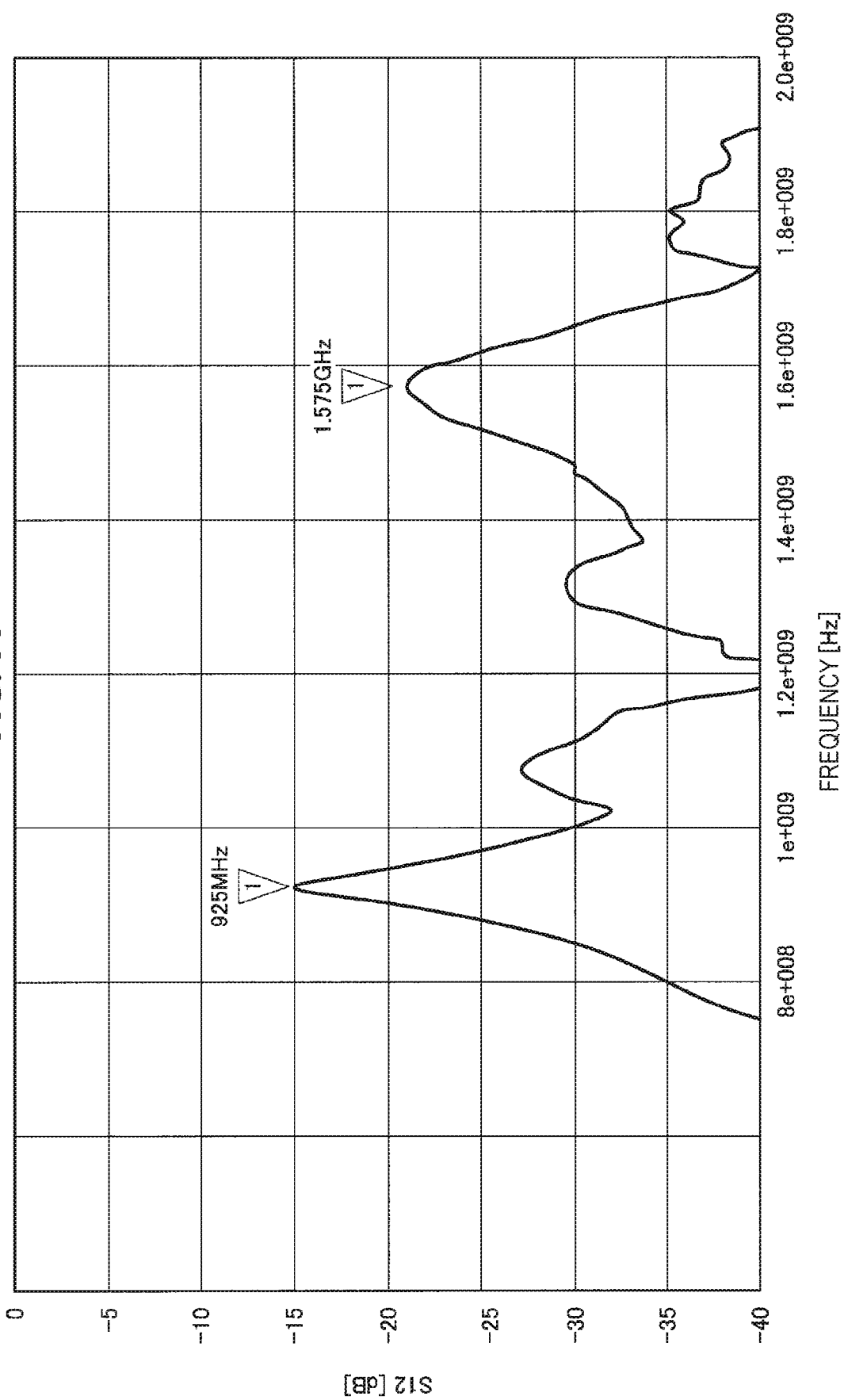
FIG. 11 is a diagram illustrating an example of an antenna characteristic of an antenna device according to an example of the embodiment.
Figure 12:
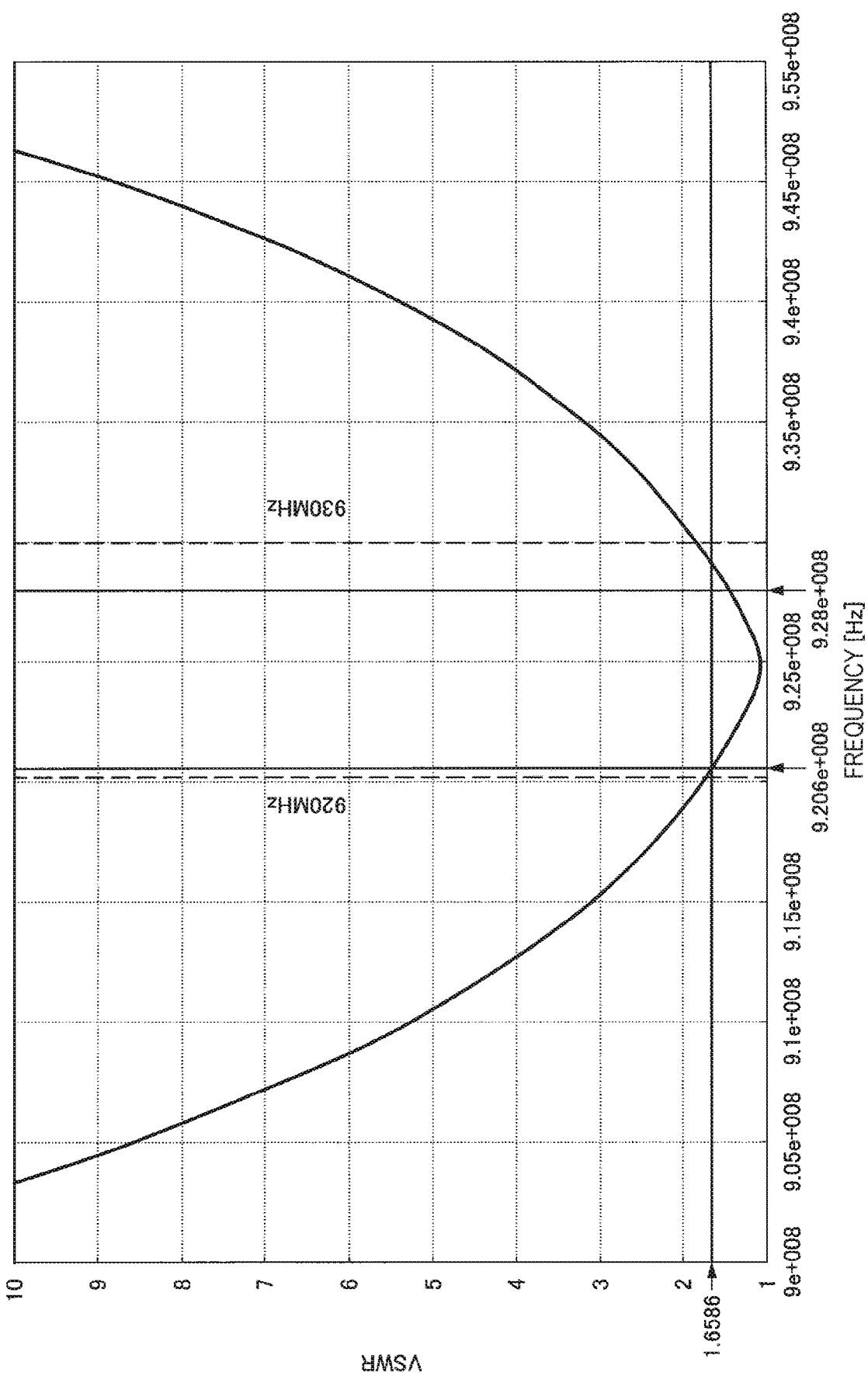
FIG. 12 is a diagram illustrating an example of an antenna characteristic of an antenna device according to an example of the embodiment.
Figure 13:
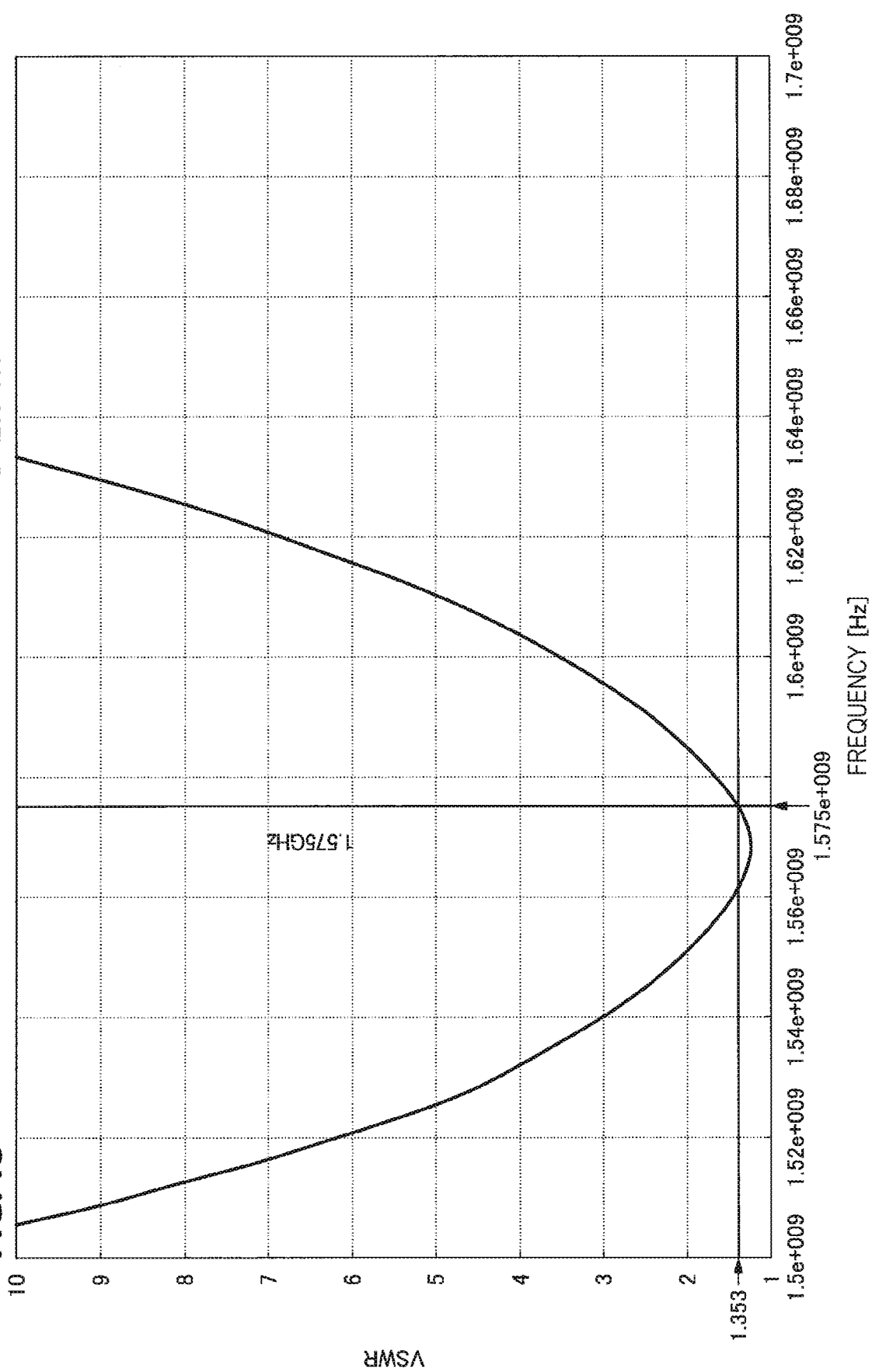
FIG. 13 is a diagram illustrating an example of an antenna characteristic of an antenna device according to an example of the embodiment.

Further, FIGS. 10 to 13 are diagrams illustrating an example of the antenna characteristic of the antenna device 100 according to an example of the present embodiment. Specifically, FIG. 10 is a Smith chart illustrating the impedance characteristic of the antenna device 100 according to the present example. Further, FIG. 11 illustrates an S parameter characteristic of the antenna device 100 according to the present example. In FIG. 11, a horizontal axis indicates a frequency (Hz), and a vertical axis indicates a measured value of a gain (dB) of an S12 parameter. Further, FIG. 12 illustrates a characteristic of a voltage standing wave ratio (VSWR) in a case in which it operates in the basic mode (that is, in a case in which the radio signal of 925 MHz is transmitted and received). Further, FIG. 13 illustrates a characteristic of the VSWR in a case in which it operates in the high-order mode (that is, in a case in which the radio signal of 1575 MHz is transmitted and received). In FIGS. 12 and 13, a horizontal axis indicates a frequency (Hz), and a vertical axis indicates a measurement result of the VSWR.

As illustrated in FIG. 10, the antenna device 100 according to the present example shows the excellent impedance characteristic in both the basic mode and the high-order mode. Further, as illustrated in FIG. 11, the antenna device 100 according to the present example satisfies 20 dB or more as isolation also in the GNSS band (that is, in the 1575 MHz band). Further, as illustrated in FIG. 12, the antenna device 100 according to the present example suppresses the VSWR to be 2 or less in the 925 MHz band in a case in which it operates in the basic mode. Similarly, as illustrated in FIG. 13, the antenna device 100 according to the present example suppresses the VSWR to be 2 or less in the 1575 MHz band even in a case in which it is operated in the high-order mode.

As described above, in the antenna device according to the present example, it is possible to transmit and receive the radio signals at 925 MHz and 1575 MHz, respectively, and it is possible to achieve the excellent antenna characteristic in both cases.

The example of the antenna characteristic in a case in which the antenna device 100 according to the present embodiment is configured to perform the dual resonances as illustrated in FIGS. 6 and 7 has been described above with reference to FIGS. 8 to 13 as an example.

2.4. EVALUATION

As described above, in the antenna device 100 according to the present embodiment, the antenna element 101 is constituted by a conductor and has a tubular shape, and the long notch section 103 extending in the axial direction is formed in at least a part of the side surface. Further, the capacitor 111a is loaded to bridge the end portions of the notch section 103 in the short direction substantially at the center of the notch section 103 in the longitudinal direction. Further, the power feed point 113a is set at a position which is apart from the capacitor 111a to the side of one end portion of the notch section 103 in the longitudinal direction and corresponds to the side of one end portion of the notch section in the short direction.

With the above configuration, in the antenna device 100 according to the present embodiment, it is possible to easily adjust the frequency (that is, the resonance frequency) of the radio signal to be transmitted and received in accordance with the capacity of the capacitor 111a to be loaded. Further, in a case in which the antenna device 100 operates in the basic mode, since the capacitor 111a is formed at a position at which the voltage becomes maximum, it is possible to cause the capacitor 111a to function efficiently. Therefore, according to the antenna device 100, it is possible to further reduce the length of the notch section 103 in the longitudinal direction without installing the capacitor over the entire notch section 103.

Further, in the antenna device 100 according to the present embodiment, the operation mode between the basic mode and the high-order mode is selectively switched, and thus it is possible to transmit and receive the radio signal using a plurality of frequencies selectively. In this case, the capacitor 111b bridging the end portions of the notch section 103 in the short direction is loaded substantial in the center between the capacitor 111a and the end portion of one of the end portions of the notch section 103 in the longitudinal direction. Further, the power feed point 113b is installed on the side of one end portion of the notch section 103 in the short direction at the position which is apart from the capacitor 111b to the end portion side positioned on the side opposite to the capacitor 111a out of the end portion of the notch section 103 in the longitudinal direction. At this time, it is desirable that the power feed point 113b be formed in the end portion opposite to the end portion in which the power feed point 113a is formed out of the end portions of the notch section 103 in the longitudinal direction.

With the above configuration, the antenna device according to the present embodiment can operate in the high-order mode and transmit and receive the radio signal of the frequency different from that in a case in which it operates in the basic mode. Further, in this case, in the antenna device 100 according to the present embodiment, it is possible to easily adjust the frequency (that is, the resonance frequency) of the radio signal transmitted and received in the high-order mode in accordance with the capacitance of the capacitor 111b to be loaded. Further, in a case in which the antenna device 100 operates in the high-order mode, since the capacitor 111b is formed at the position at which the voltage becomes maximum, it is possible to cause the capacitor 111b to function efficiently. Therefore, according to the antenna device 100, it is possible to further reduce the length of the notch section 103 in the longitudinal direction without installing the capacitor over the entire notch section 103.

In addition, according to the antenna device 100 of the present embodiment, it is possible to individually load the capacitors 111a and 111b having capacitances corresponding to the resonance frequencies in the respective modes under the assumption that it operates in each of the basic mode and the high-order mode. In other words, according to the antenna device 100 of the present embodiment, it is possible to individually set the frequency band used for transmitting and receiving the radio signal in accordance with the capacitance of each of a plurality of capacitors. Therefore, according to the antenna device 100 of the present embodiment, even in a case in which no slot is additionally formed, although only one slot (notch section 103) is formed, it is possible to transmit and receive the radio signal using a plurality of frequencies selectively. Further, at this time, it is possible to set the power feed points corresponding to the respective frequencies at different end portion sides, and thus it is possible to further reduce the occurrence of interference (isolation) between the radio signals corresponding to the respective frequencies.

As described above, according to the antenna device 100 of the present embodiment, since the length of the slot and the number of slots are further reduced, it is possible to realize excellent communication characteristics while securing the strength assumed a case in which it is configured as a part of the stick-like object such as the cane, for example, as illustrated in FIG. 2. Further, in a case in which it is configured as a part of the stick-like object such as the cane as illustrated in FIG. 2, the stick-like object itself operates as an antenna. Therefore, when the antenna device 100 according to the present embodiment is applied, it is possible to prevent deterioration in the antenna characteristic associated with the interference between the metal pipe and the antenna device as compared with a case in which a metal pipe constituting the cane and the antenna device are individually formed. Further, in the present embodiment, the antenna device 100 has a simple shape with less protrusions and requires few additional members, and thus it is possible to from the antenna as a part of a stick-like instrument without damaging the design of the stick-like instrument such as the cane.

3. SECOND EMBODIMENT

Next, an example of a configuration and control of a communication system according to the present disclosure will be described as a second embodiment of the present disclosure. Further, a schematic configuration of the communication system according to the present embodiment is similar to that described above with reference to FIG. 1.

3.1. OVERVIEW

Figure 14:
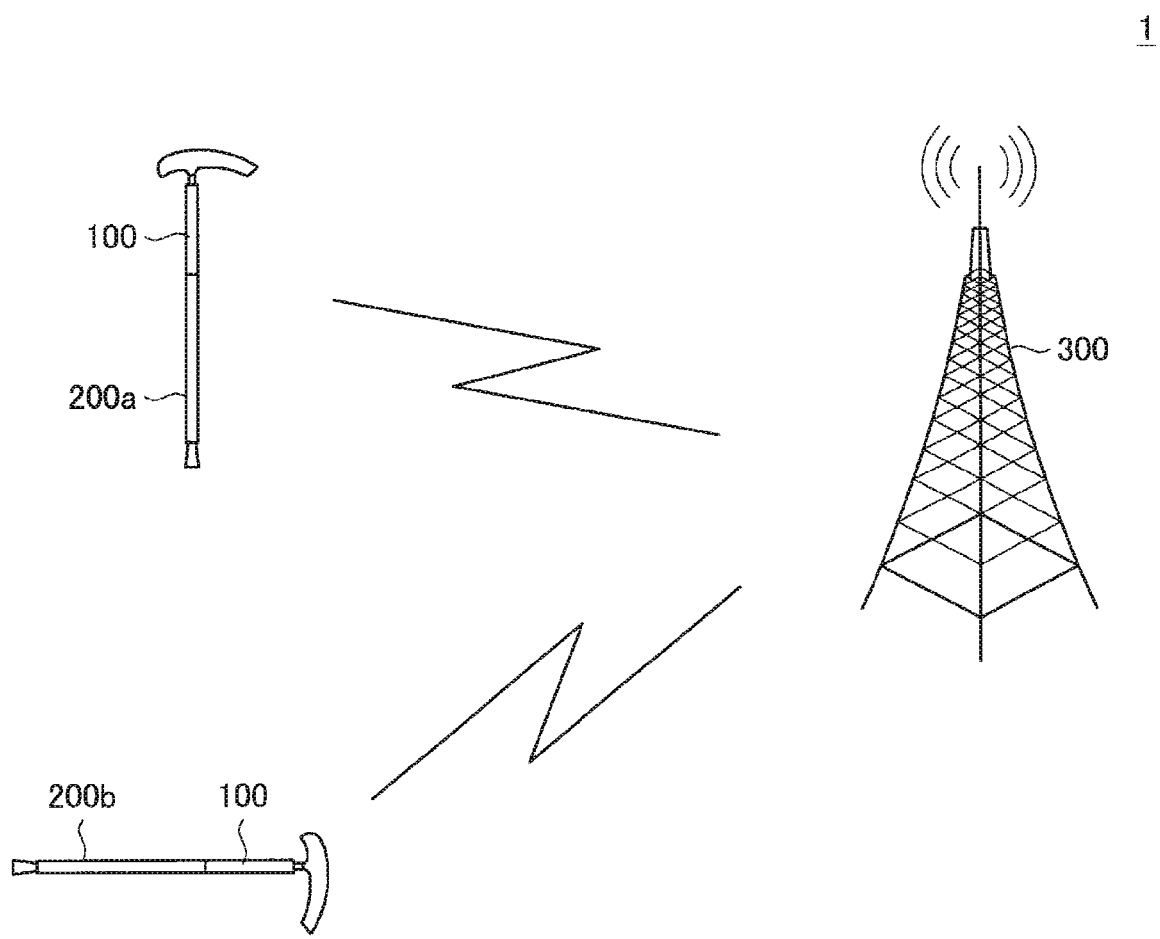
FIG. 14 is an explanatory diagram for describing an overview of a communication system according to a second embodiment of the present disclosure.

First, an overview of the communication system according to the present embodiment will be described with reference to FIG. 14. FIG. 14 is an explanatory diagram for describing an overview of the communication system according to the present embodiment.

As described above, the communication device 200 includes the antenna device 100 that performs wireless communication for the stick-like instrument such as the cane, a circuit for controlling communication via the antenna device 100, and the like. Further, the communication device 200 includes a detecting unit (for example, various sensors) for detecting its own state, and estimates the state of the target person in accordance with a detection result of the state.

As a specific example, the communication device 200 includes an angle sensor that detects an angle (that is, posture) of an inclination of its housing (for example, the shaft section 293 illustrated in FIG. 2) configured as the stick-like object and estimates the state of a predetermined target person who is its user in accordance with the detection result of its own posture. For example, in a case in which the communication device 200 configured as the stick-like object (cane) is upright as indicated by reference numeral 200a, a state in which the communication device 200 is held by the user (that is, the target person) is assumed, that is, the user is estimated to be in a normal state. On the other hand, in a case in which the communication device 200 is sideways as indicated by reference numeral 200b, a state in which the communication device 200 is not held by the user is assumed, and a state in which a certain abnormality occurs in the user is estimated. Further, at this time, in a case in which the state in which the communication device 200 is sideways is continued for a predetermined period or more, a state in which a certain abnormality occurs in the user may be estimated.

Further, the communication device 200 according to the present embodiment controls an operation related to transmission of information (data) (that is, an operation related to transmission of a radio signal) to other devices via a wireless communication path on the basis of an estimation result of the state of a predetermined target person corresponding to the detection result of its own state. For example, the communication device 200 may selectively switch data to be transmitted to other devices in accordance with whether the communication device 200 is in the upright state or the sideways state. As a specific example, in a case in which the communication device 200 is in the upright state, the communication device 200 estimates that the target person is in the normal state and transmits normal data to other devices. On the other hand, in a case in which the state in which the communication device 200 is sideways is detected, the communication device 200 may estimate that a certain abnormality occurs in the target person and transmit data corresponding to abnormality or emergency such as data indicating the occurrence of an abnormality to other devices.

On the basis of such a configuration, the communication system 1 according to the present embodiment can confirm the state of the target person even in situation in which the target person such as an elderly person or a sick person moves not only within a predetermined region such as home or a predetermined facility but also moves to a region other than a predetermined region such as an outdoor place. Further, the communication system 1 according to the present embodiment will be described below in further detail.

3.2. FUNCTIONAL CONFIGURATION

Figure 15:
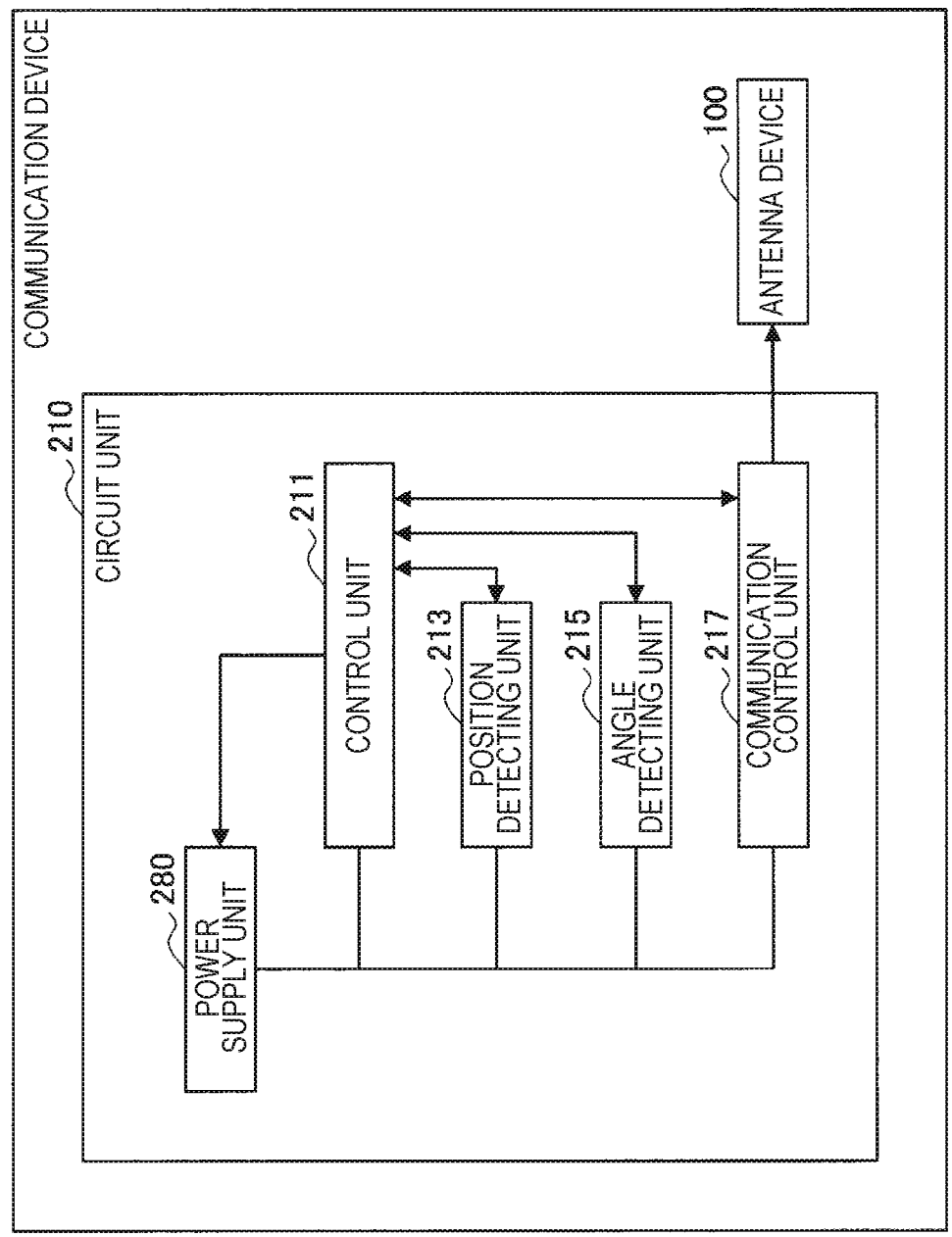
FIG. 15 is a block diagram illustrating an example of a functional configuration of a communication device according to the embodiment.

First, an example of a functional configuration of the communication device 200 according to the present embodiment will be described with reference to FIG. 15. FIG. 15 is a block diagram illustrating an example of a functional configuration of the communication device 200 according to the present embodiment. Further, the communication device 200 according to the present embodiment includes an antenna device 100 that performs wireless communication for the stick-like instruments such as the cane, for example, as illustrated in FIG. 2, a circuit for controlling communication via the antenna device 100, and the like.

As illustrated in FIG. 15, the communication device 200 according to the present embodiment includes an antenna device 100 and a circuit unit 210. Further, the antenna device 100 and the circuit unit 210 illustrated in FIG. 15 correspond to the antenna device 100 and the circuit unit 210 illustrated in FIG. 2, respectively.

As the antenna device 100, for example, the antenna device 100 according to the first embodiment described above with reference to FIGS. 6 and 7 can be applied. Further, as the antenna device 100, other antenna devices such as a so-called dipole antenna, a monopole antenna, or the like may be applied in addition to the antenna device 100 according to the first embodiment.

The circuit unit 210 includes a control unit 211, an angle detecting unit 215, a communication control unit 217, and a power supply unit 280. Further, the circuit unit 210 may include a position detecting unit 213.

The position detecting unit 213 is constituted by, for example, a Global Positioning System (GPS) or the like, and detects the position of the communication device 200, and notifies the control unit 211 of a detection result. Further, the position detecting unit 213 may use the antenna device 100 for wireless communication with a satellite.

The angle detecting unit 215 is constituted by an angle sensor or the like, and detects a change in an angle (that is, a posture) of an inclination of the communication device 200

(in particular, a portion configured as the stick-like object), and transmits a detection result to the control unit 211.

The power supply unit 280 includes a power source such as a battery or the like, and supplies electrical power for operating the respective components to the respective components in the circuit unit 210 (for example, the control unit 211, the position detecting unit 213, the angle detecting unit 215, and the communication control unit 217). Further, supply of power to at least one of the respective components in the circuit unit 210 by the power supply unit 280 may be controlled through the control unit 211 to be described later.

The communication control unit 217 is a component for controlling communication with other devices (for example, the information processing device 350 illustrated in FIG. 2) via the wireless communication path by driving the antenna device 100. For example, the communication control unit 217 may include a component for performing frequency conversion on a target signal between a carrier frequency and a baseband such as a mixer or an oscillator (local oscillator) for driving the mixer. Further, the communication control unit 217 may include a component for extracting a signal of a desired frequency component from a reception signal (for example, a signal in which a plurality of frequency components is multiplexed) received by the antenna device 100 such as a so-called RF circuit, a band pass filter, or a switch. Further, the communication control unit 217 may include a signal processing unit for demodulating the reception signal received by the antenna device 100 and modulating data serving as a transmission target into a transmission signal.

For example, the communication control unit 217 frequency-converts the reception signal received by the antenna device 100 into a baseband signal and demodulates reception data from the converted communication signal on the basis of a predetermined communication scheme. Then, the communication control unit 217 outputs the demodulated reception data to, for example, the control unit 211 to be described later. Accordingly, the control unit 211 can execute a desired function (for example, an application) on the basis of the reception data.

Further, the communication control unit 217 may acquire transmission data serving as a transmission target from the control unit 211 to other devices, modulate the acquired data on the basis of a predetermined communication scheme, and generate a baseband transmission signal. The communication control unit 217 may convert the frequency of the transmission signal generated by modulating the transmission data from the baseband into the carrier frequency and transmit the converted transmission signal to the antenna device 100.

The control unit 211 executes various types of functions provided by the communication device 200 by controlling the operation of the respective units of the communication device 200.

For example, the control unit 211 acquires a detection result of the posture (that is, the angle of the slope) of the housing of the communication device 200 (in particular, the part configured as the stick-like object such as the shaft section 293 illustrated in FIG. 2) from the angle detecting unit 215 and estimates the state of a predetermined target person (for example, the user of the communication device 200) on the basis of the detection result. Then, the control unit 211 may control an operation related to transmission of information (data) from the communication device 200 to other devices via the wireless communication path (that is, the operation related to the transmission of the radio signal) by controlling the communication control unit 217 on the basis of the estimation result of the state of the target person.

For example, the control unit 211 may estimate that a certain abnormality occurs in the target person in a case in which the state in which the communication device 200 configured as the stick-like object is sideways is detected. Further, at this time, the control unit 211 may sequentially accumulate the detection result of the posture of the housing of the communication device 200 by the angle detecting unit 215 for a predetermined period and estimate that a certain abnormality occurs in the target person in a case in which the state in which the communication device 200 is sideways continues for a predetermined period or more. Then, in a case in which it is estimated that a certain abnormality occurs in the target person, the control unit 211 may control the communication control unit 217 such that information (data) indicating the abnormality of the target person is transmitted to other devices as the transmission data. Further, at this time, for example, the control unit 211 may include the detection result of the position of the communication device 200 by the position detecting unit 213 in the information to be transmitted to other devices. With such a configuration, in a case in which it is estimated that a certain abnormality occurs in the target person, the control unit 211 can give a notification of information indicating that an abnormality occurs in the target person and the position information of the target person to the users of other devices (for example, the persons related to the target person). In other words, on the basis of the information transmitted from the communication device 200, the users of other devices can recognize that a certain abnormality occurs in the target person and recognize the position of the target person. Further, the control unit 211 may perform control such that data is transmitted to other devices only in a case in which it is estimated that a certain abnormality occurs in the target person. Further, in a case in which it is estimated that the target person is in the normal state, the control unit 211 may temporarily stop (or suppress) the transmission of data to other devices.

Further, the control unit 211 may control the transmission method of the radio signal (that is, transmission data) such as transmission power of the radio signal, a communication channel (that is, the radio frequency) for transmitting the radio signal, a modulation method of the transmission data, and an error correction code rate of the transmission data on the basis of the estimation result of the state of the target person.

As a specific example, in a case in which it is estimated that a certain abnormality occurs in the target person, the control unit 211 may perform control such that the transmission power of the radio signal is further increased so that a radio signal obtained by modulating the information (data) indicating the abnormality of the target person easily reaches the base station 300. Further, as another example, in a case in which it is estimated that a certain abnormality occurs in the target person, the control unit 211 may perform control such that a carrier to noise ratio (C/N ratio) which is set for emergency communication in advance is used by a communication channel (emergency communication channel) of a narrower band communication. Further, as another example, in a case in which it is estimated that a certain abnormality occurs in the target person, the control unit 211 may perform control such that the modulation method of the transmission data is changed to a modulation method (communication mode) in which communication can be performed at a lower C/N ratio, for example, from QPSK to BPSK. Further, as another example, in a case in which it is estimated that a certain abnormality occurs in the target person, in order to cause the transmission data to be reliably delivered to other devices serving as a transmission destination, the control unit 211 perform control such that the error correction code rate of the transmission data is further increased. Of course, the control examples of the transmission method of the radio signal described above are merely examples, and the control by the control unit 211 is not necessarily limited to the examples described above.

Further, there are cases in which, in the state in which the communication device 200 is upright and the state in which the communication device 200 is sideways, a relative direction of the antenna device 100 changes, and a polarization direction of the radio signal transmitted from the antenna device 100 changes. Particularly, under circumstances in which cross polarization occurs between transmitting and receiving antennas, propagation conditions of the radio signal may degrade. For this reason, the control unit 211 may control the transmission method of the radio signal (that is, the transmission data) in accordance with the polarization direction of the radio signal associated with the state of the communication device 200. As a specific example, in a situation in which the propagation condition of the radio signal to the base station 300 deteriorates in accordance with the polarization direction of the radio signal, the control unit 211 may control the transmission method of the radio signal so that the radio signal is transmitted in a better condition. Further, the example of the control related to the transmission method of the radio signal has been described above.

Further, as another example, in a case in which a transmission ground height related to the transmission of the radio signal by the communication device 200 becomes lower, the propagation condition of the radio signal may deteriorate. For this reason, for example, the control unit 211 may detect the transmission ground height in accordance with a detection result by a predetermined detecting unit (for example, a GPS or the like) and control the transmission method of the radio signal in accordance with the detection result such that the radio signal is transmitted in a better condition.

Further, the communication device 200 may control the supply of the power to at least some of the respective components in the circuit unit 210 by the power supply unit 280 in accordance with a detection result of a predetermined detecting unit (for example, the position detecting unit 213, the angle detecting unit 215, or the like). As a specific example, the communication device 200 may estimate the state of the target person in accordance with the detection result by the angle detecting unit 215 and control the supply of the power to the position detecting unit 213 such that the position detecting unit 213 is driven in a case in which it is estimated that a certain abnormality occurs in the target person. With such a configuration, it is also possible to suppress the power consumption by, for example, driving the position detecting unit 213 only in a case in which a certain abnormality occurs in the target person.

The example of the functional configuration of the communication device 200 according to the present embodiment has been described above with reference to FIG. 15.

3.3. PROCESS

Figure 16:
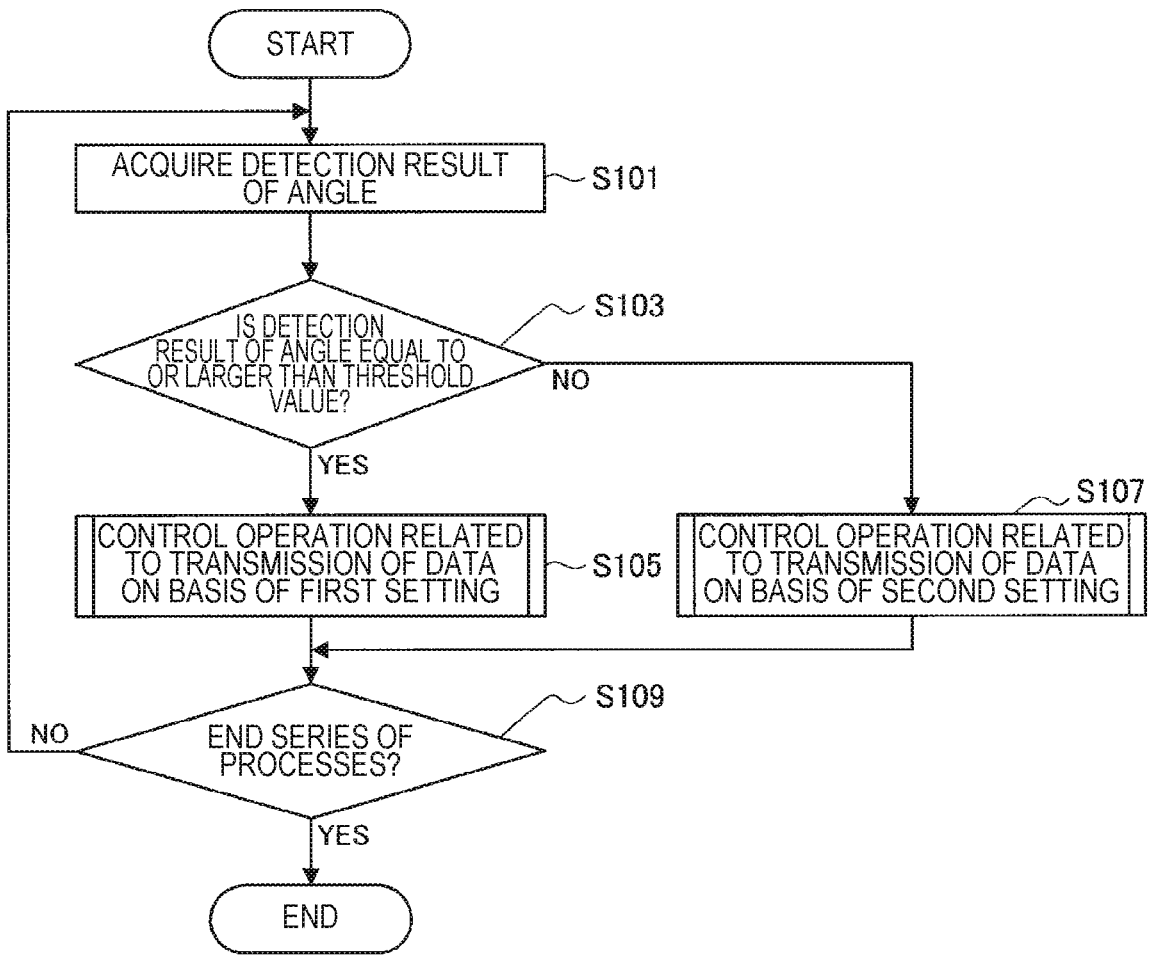
FIG. 16 is a flowchart illustrating an example of a flow of a series of processes of a communication device according to the embodiment.

Next, an example of a flow of a series of processes of the communication device 200 according to the present embodiment will be described with reference to FIG. 16. FIG. 16 is a flowchart illustrating an example of a flow of a series of processes of the communication device 200 according to the present embodiment.

As illustrated in FIG. 16, the communication device 200 (the control unit 211) acquires the detection result of the change in the angle of the inclination (that is, the posture) of its own housing by the angle detecting unit 215 (S101).

Then, the communication device 200 (the control unit 211) determines whether or not the acquired detection result of the angle of the inclination of the housing is equal to or greater than a threshold value (S101). In a case in which the detection result of the angle of the inclination of the housing is equal to or larger than the threshold value (YES in S103), the communication device 200 (the control unit 211) may control the operation related to the transmission of data to other devices via the wireless communication path on the basis of a first setting which is performed in advance (S105). As a specific example, in a case in which the communication device 200 itself configured as the stick-like object such as the cane or the like is in the upright state, the communication device 200 estimates that the target person is in the normal state and may transmit the normal data to other devices. Further, in a case in which the communication device 200 is in the upright state, the communication device 200 may temporarily stop transmitting data to other devices.

On the other hand, in a case in which the detection result of the angle of the inclination of the housing is less than the threshold value (NO in S103), the communication device 200 (the control unit 211) may control the operation related to the transmission of data to other devices via the wireless communication path on the basis of a second setting which is performed in advance (S107). As a specific example, in a case in which the state in which the communication device 200 itself is sideways is detected, the communication device 200 may estimate that a certain abnormality occurs in the target person and transmit the data indicating that an abnormality occurs in the target person (that is, abnormal time data which is different from the normal data) to other devices. Further, at this time, the communication device 200 may acquire the detection result of its own position (eventually, the position of the target person who is its user) and include the detection result of the position in the data to be transmitted to other devices. Further, as another example, the communication device 200 may control the transmission method of the radio signal (that is, transmission data) such as transmission power of the radio signal, a communication channel (that is, the radio frequency) for transmitting the radio signal, a modulation method of the transmission data, and an error correction code rate of the transmission data.

Then, the communication device 200 appropriately executes a series of processes indicated by reference numerals S101 to S107 until an instruction to end a series of processes is given (NO in S109). Specifically, the communication device 200 may execute a series of processes indicated by reference numerals S101 to S107 at predetermined timings. Further, as another example, the communication device 200 may execute a series of processes indicated by reference numerals S101 to S107 using the occurrence of a predetermined event as a trigger. In a case in which an instruction to end a series of processes is given (YES in S109), the communication device 200 ends the execution of a series of processes indicated by reference numerals S101 to S107.

The example of the flow of a series of processes of the communication device 200 according to the present embodiment has been described above with reference to FIG. 16.

3.4. MODIFIED EXAMPLES

Next, modified examples of the communication system according to the present embodiment will be described.

First Modified Example: Control Using Position Information

First, as a first modified example, an example in which the state of the target person who is the user of the communication device is estimated in accordance with the detection result of the position information of the communication device, and the operation related to the transmission of data to other devices via the wireless communication path is controlled on the basis of the estimation result will be described.

For example, the communication device 200 may sequentially accumulate the detection results of its own position (eventually, the position of the target person) for a predetermined period, recognize whether or not its position changes during the predetermined period, and control the operation related to the transmission of data to other devices in accordance with the recognition result. As a specific example, in a case in which the state in which the communication device 200 itself configured as the stick-like object is sideways continues for a predetermined period or more, and its position does not change during the period, it may be estimated that a certain abnormality occurs in the target person. Then, similarly to the communication device 200 according to the above-described embodiment, in a case in which it is estimated that a certain abnormality occurs in the target person, the communication device 200 may transmit, for example, the information (data) indicating the abnormality of the target person to other devices via the wireless communication path. Further, the communication device 200 may control the transmission method of the radio signal (that is, transmission data) such as transmission power of the radio signal, a communication channel (that is, the radio frequency) for transmitting the radio signal, a modulation method of the transmission data, and an error correction code rate of the transmission data on the basis of the estimation result of the state of the target person.

Further, as another example, the communication device 200 may control the operation related to the transmission of data to other devices depending on whether or not the detection result of its own position (eventually, the position of the target person) is within a predetermined region.

Figure 17:
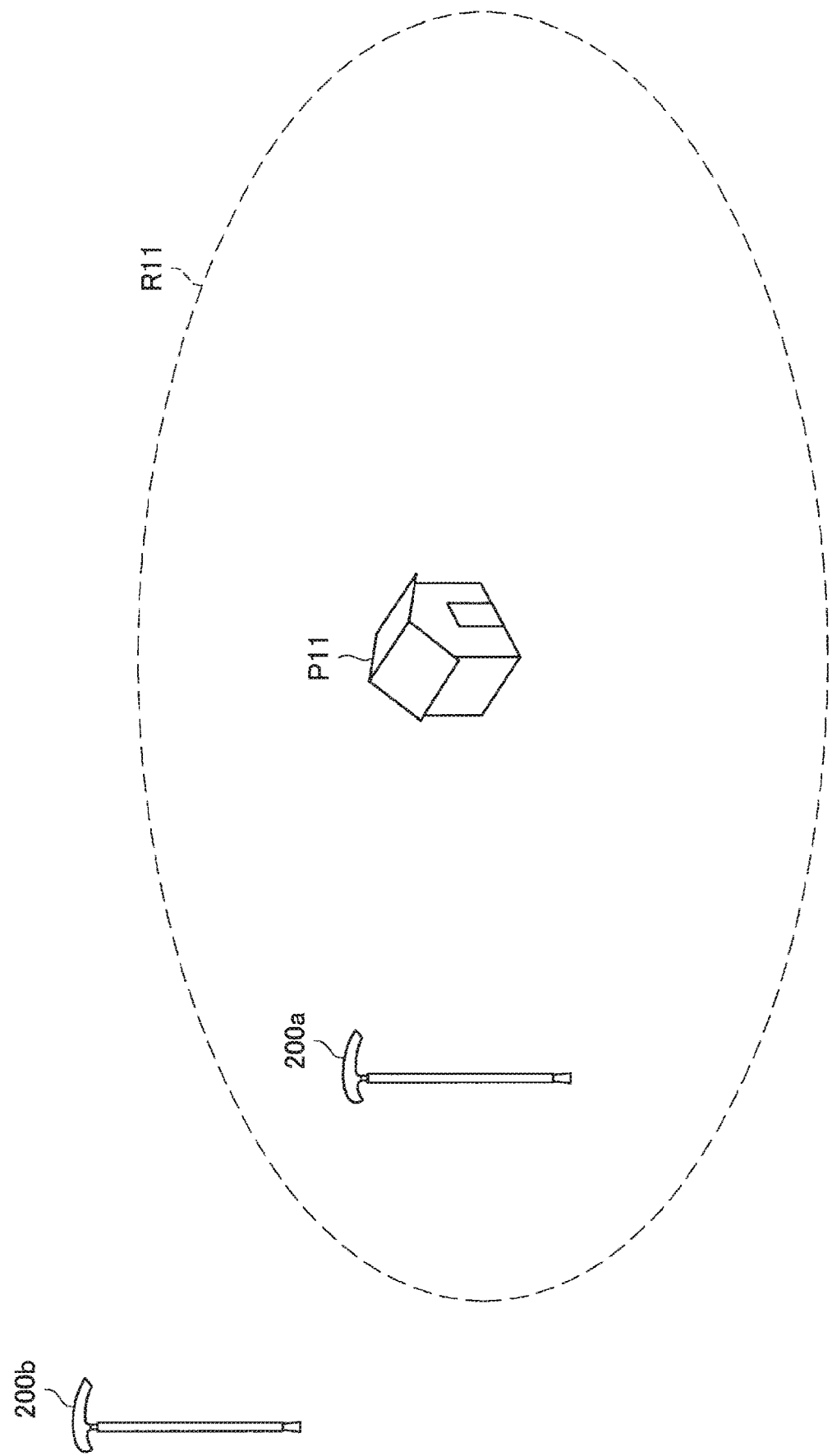
FIG. 17 is an explanatory diagram for describing an example of a communication system according to a first modified example of the embodiment.

For example, FIG. 17 is an explanatory diagram for describing an example of the communication system according to the first modified example of the present embodiment. In the example illustrated in FIG. 17, a region R11 in a predetermined range based on a pre-registered position P11 such as home of the target person is specified, and the communication device 200 controls the operation related to the transmission of data to other devices depending on whether or not it is located within the region R11. For example, the communication device 200 may control the transmission method of the radio signal in a case in which the communication device 200 itself is located in the region R11 as indicated by reference numeral 200a and a case in which the communication device 200 itself is located outside the region R11 as indicated by reference numeral 200b. As a more specific example, in a case in which the state in which there is no change in the position or the posture of the communication device 200 (for example, the state in which the communication device 200 is sideways and stays) continues for a predetermined period or more and is located outside the region R11, the communication device 200 may increases the transmission power of the radio signal and transmit the data indicating the occurrence of the abnormality in the target person to other devices.

Further, the above example is merely an example, and a method thereof is not particularly limited as long as the operation related to the transmission of data to other devices via the wireless communication path can be controlled in accordance with the detection result of the position of the communication device 200 (eventually, the position of the target person). Further, it will be appreciated that the functions described as the first modified example can be used in combination with the functions of the communication device 200 according to the above-described embodiment.

As described above, as the first modified example, the example in which the state of the target person who is the user of the communication device is estimated in accordance with the detection result of the position information of the communication device, and the operation related to the transmission of data to other devices via the wireless communication path is controlled on the basis of the estimation result has been described.

Second Modified Example: Control Using Plurality of Antenna Devices

Next, as a second modified example, an example of control in which a plurality of antenna devices is installed in the communication device, and the data is transmitted to other devices via the wireless communication path using a plurality of antenna devices will be described.

Figure 18:
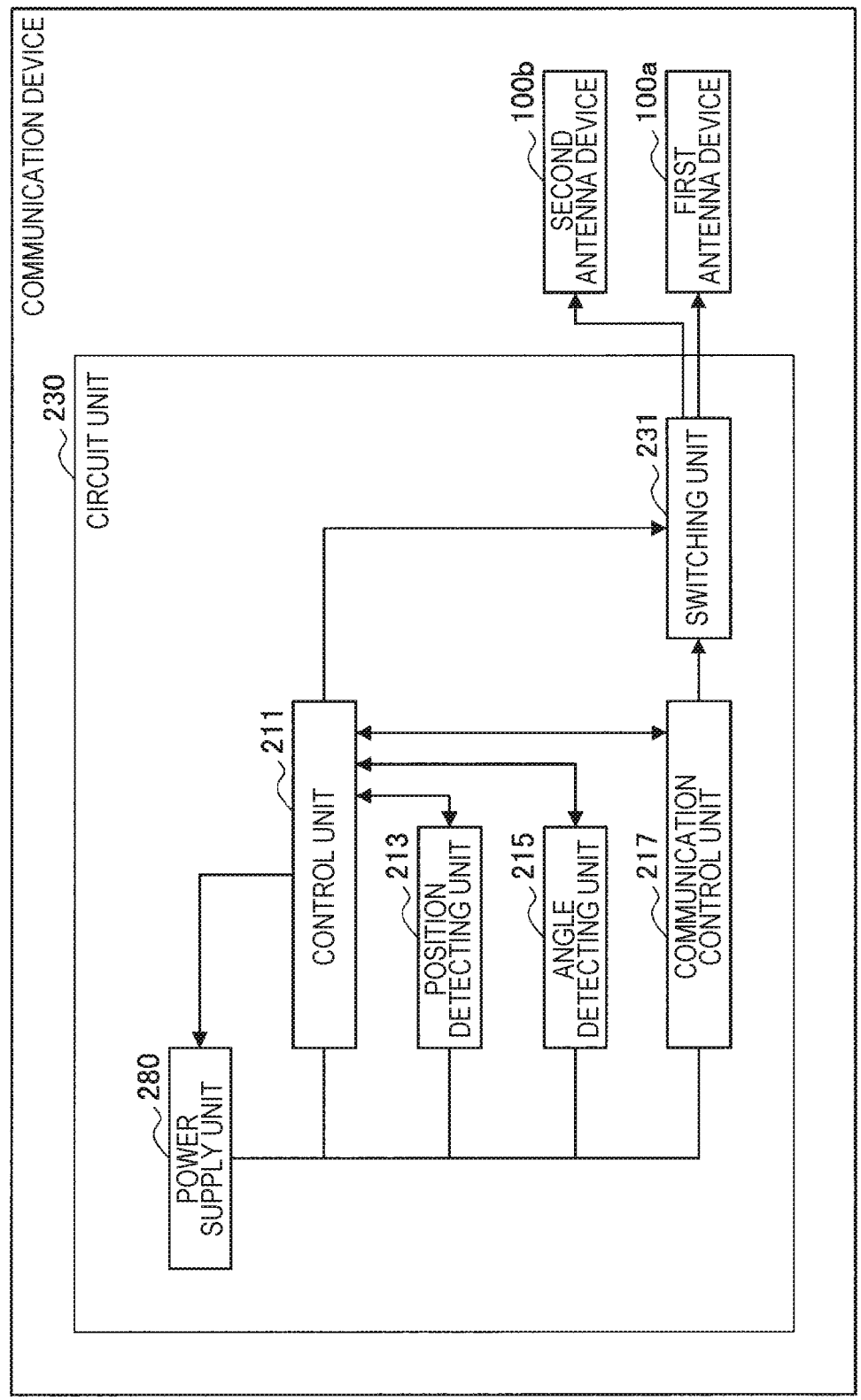
FIG. 18 is a block diagram illustrating an example of a functional configuration of a communication device according to a second modified example of the embodiment.

For example, FIG. 18 is a block diagram illustrating an example of a functional configuration of a communication device according to a second modified example of the present embodiment. Further, in this description, a communication device according to the second modified example is also referred to as a "communication device 400" to be distinguished from the communication device according to the above-described embodiment the and other modified examples.

The communication device 400 according to a second modified example differs from the communication device 200 described above with reference to FIG. 23 in that a plurality of antenna devices (that is, a first antenna device 100a and a second antenna device 100b) and a switching unit 231 are included as illustrated in FIG. 18. Therefore, in the present description, the functional configuration of the communication device 400 according to the second modified example will be described particularly focusing on the difference from the communication device 200 described above with reference to FIG. 23, and detailed description of parts substantially similar to those of the communication device 200 will be omitted.

The switching unit 231 is constituted by a so-called switch or the like, and selectively switches the antenna device to be connected to the communication control unit 217 between the first antenna device 100a and the second antenna device 100b. The operation of the switching unit 231 is controlled by, for example, the control unit 211.

As the first antenna device 100a and the second antenna device 100b, antenna devices having different characteristics may be applied. For example, the first antenna device 100a and the second antenna device 100b may be arranged so that polarization directions of the radio signals are different. As a specific example, the first antenna device 100a and the second antenna device 100b may be arranged so that the polarization directions of the radio signals are different from each other by substantially 90°. More specifically, in a case in which the first antenna device 100a is arranged so that the polarization direction becomes the horizontal direction in the state in which the communication device 400 configured as the stick-like object is upright, it is desirable to arrange the second antenna device 100b so that the polarization direction becomes the vertical direction. With such a configuration, in each of the state in which the communication device 400 is in the upright state and the state in which the communication device 400 is sideways, the polarization direction of at least one of the first antenna device 100a or the second antenna device 100b becomes the horizontal direction, and the polarization direction of the other antenna device becomes the vertical direction.

As described above, the propagation condition of the radio signal may deteriorate under a situation in which cross polarization occurs between the transmitting and receiving antennas. Assuming such a situation, for example, the control unit 211 may control the operation of the switching unit 231 such that the antenna device that does not become cross polarization out of the transmitting and receiving antennas is used for the transmission of the transmission data in accordance with the detection result of the angle of the inclination (that is, the posture) of the communication device 400 by the angle detecting unit 215. With such control, for example, in a case in which it is estimated that a certain abnormality occurs in the target person, the communication device 400 can perform control such that the radio signal obtained by modulating the information (data) indicating the abnormality of the target person easily reaches the base station 300.

Further, for example, the antenna device 100 according to the first embodiment described above with reference to FIGS. 6 and 7 can be applied as one of the first antenna device 100a and the second antenna device 100b. Further, as at least one of the first antenna device 100a or the second antenna device 100b, not only the antenna device 100 according to the first embodiment but also other antenna devices such as a so-called dipole antenna, a monopole antenna, or the like may be applied. Further, in this case, it is desirable that the antenna lengths of other antenna devices are substantially equal to an integral multiple of a ¼ wavelength of the radio signal (radio wave) to be transmitted and received.

Further, it will be appreciated that the functions described as the second modified example can be used in combination with the functions of the communication device 200 according to the above-described embodiment the and other modified examples. As a specific example, the control unit 211 may selectively switch the antenna device to be used for the transmission of the transmission data in accordance with the detection result of the angle of the inclination of the communication device 400 and control the transmission method of the transmission data.

As described above, as the second modified example, the example of control in which a plurality of antenna devices is installed in the communication device, and the data is transmitted to other devices via the wireless communication path using a plurality of antenna devices has been described.

Third Modified Example: Application Example to Sea Buoy

Next, as a third modified example, an example in which the communication device according to the present embodiment is applied to a sea buoy will be described.

Figure 19:
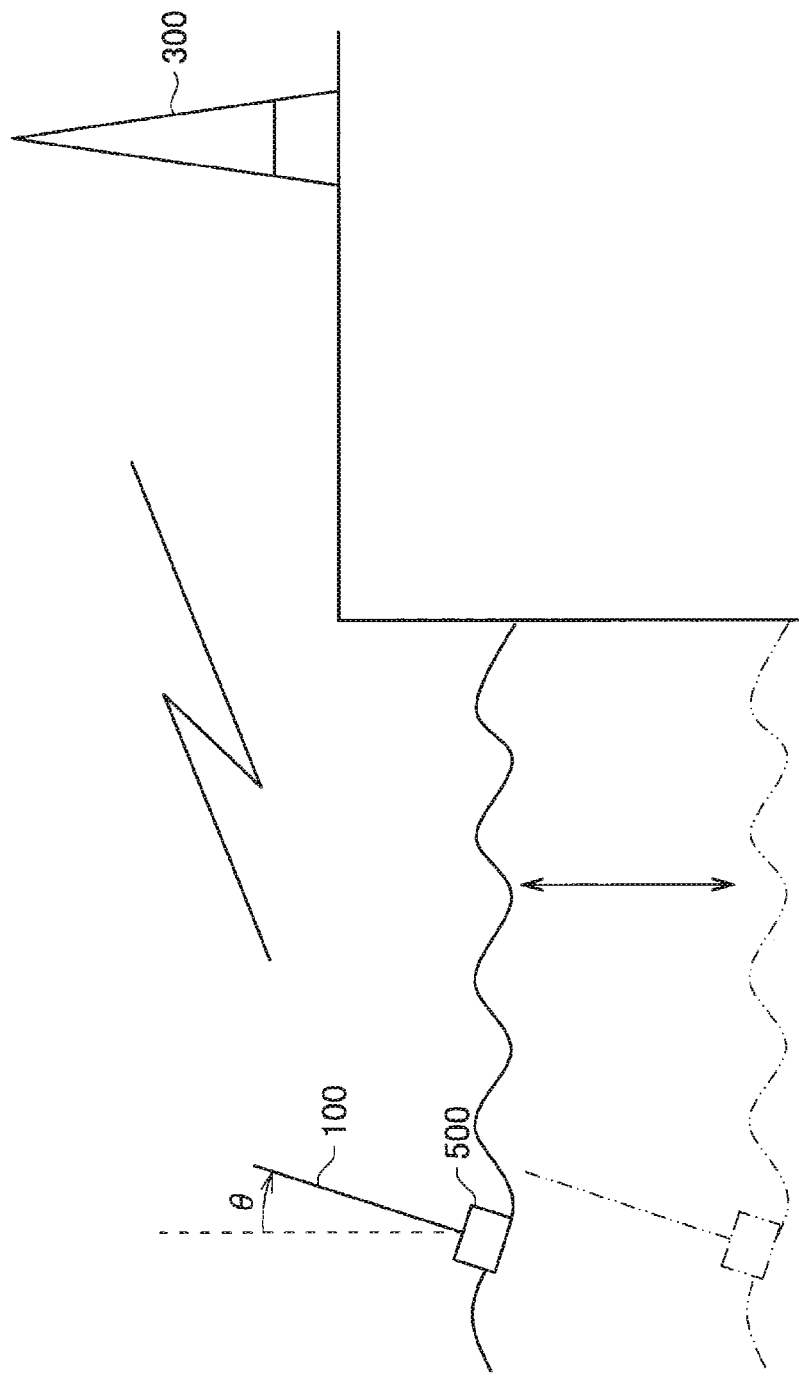
FIG. 19 is an explanatory diagram for describing an overview of a communication device according to a third modified example of the embodiment.

For example, FIG. 19 is an explanatory diagram for describing an overview of a communication device according to a third modified example. Further, in this description, a communication device according to the third modified example is also referred to as a "communication device 500" to be distinguished from the communication device according to the above-described embodiment the and other modified examples.

As illustrated in FIG. 19, in the present modified example, a case in which the communication device 500 (transmitter) is held on the sea buoy, and the communication device 500 communicates with the base station 300 is assumed. On the other hand, under such circumstances, the propagation loss increases since the position (in particular, the position in the vertical direction) of the antenna device 100 of the communication device 500 changes due to waves or tides, or the posture (inclination) of the antenna device 100 changes, and thus the gain of the antenna device 100 may decrease.

Figure 20:
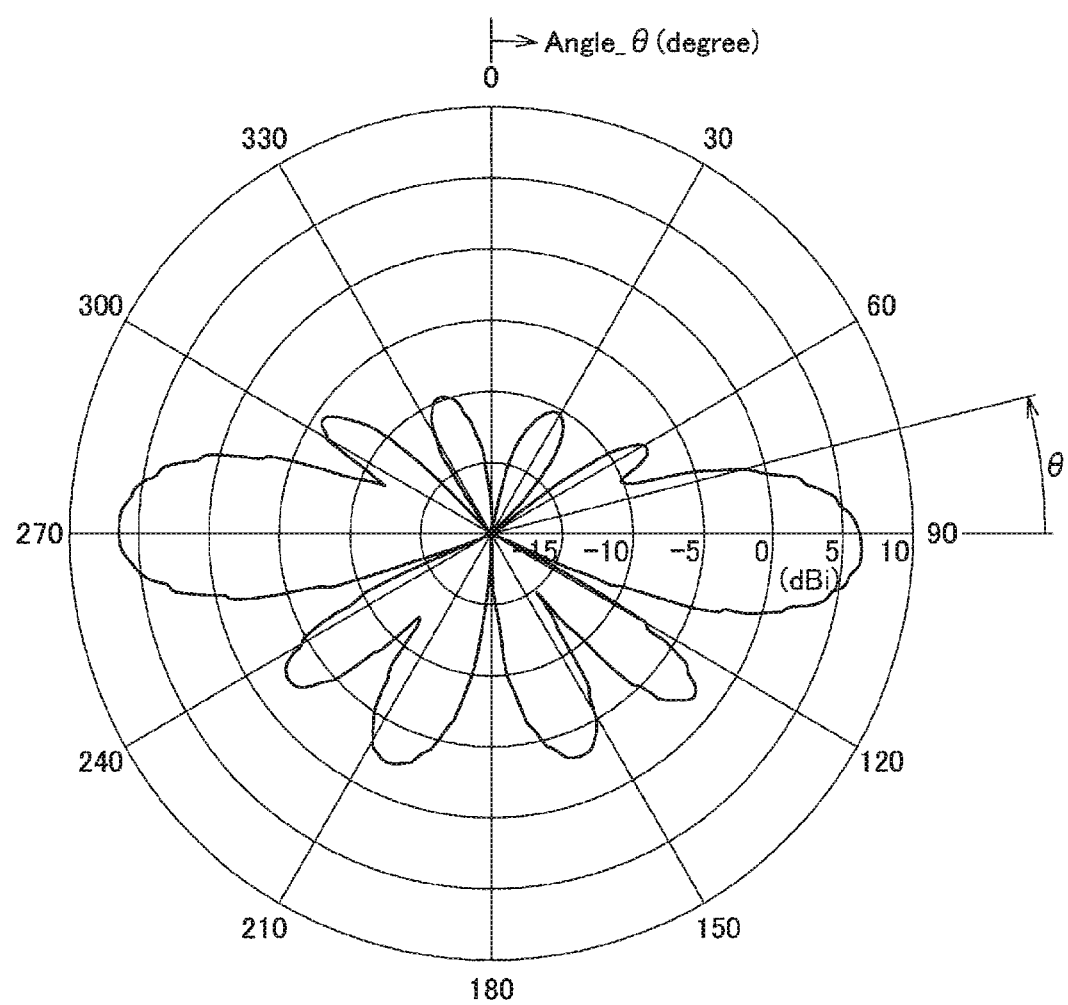
FIG. 20 is a diagram illustrating an example of an antenna characteristic of an antenna device applied to a communication device according to a third modified example of the embodiment.

For example, FIG. 20 is a diagram illustrating an example of an antenna characteristic of the antenna device applied to the communication device according to a third modified example, and illustrates an example of a radiation pattern of the antenna device 100 illustrated in FIG. 19. Further, an angle θ illustrated in FIG. 20 corresponds to an angle θ illustrated in FIG. 19. In other words, in the example illustrated in FIG. 20, in a case in which the antenna device 100 is inclined by about 15° due to the influence of waves, the gain of the antenna device 100 is lowered by about 10 dB. In light of such circumstances, the communication device 500 according to the third modified example detects a change in the position or the inclination of the antenna device 100, and performs control such that communication with the base station 300 is performed under a condition that the communication characteristic of the antenna device 100 is further increased on the basis of the detection result.

Figure 21:
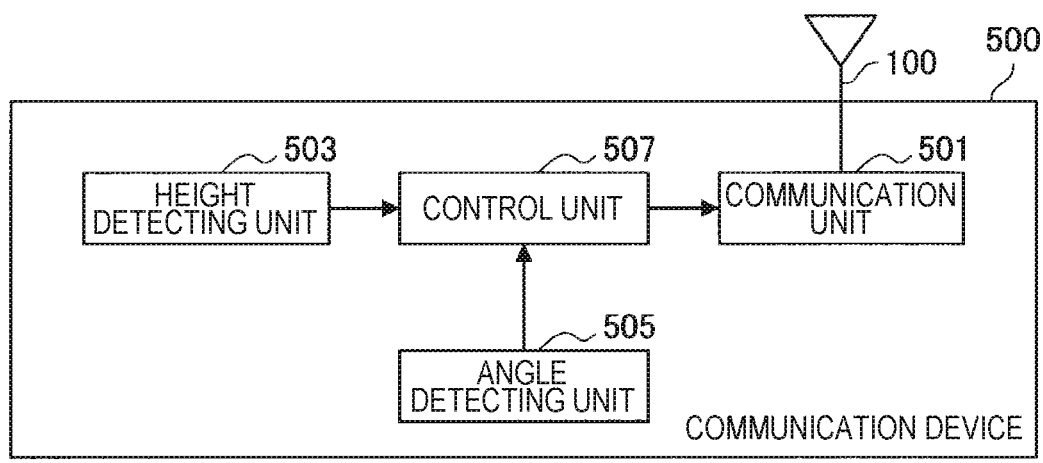
FIG. 21 is a block diagram illustrating an example of a functional configuration of a communication device 500 according to the third modified example of the embodiment.

For example, FIG. 21 is a block diagram illustrating an example of a functional configuration of the communication device 500 according to a third modified example. As illustrated in FIG. 21, the communication device 500 includes an antenna device 100, a communication unit 501, a height detecting unit 503, an angle detecting unit 505, and a control unit 507. Further, the antenna device 100 corresponds to the antenna device 100 according to the present embodiment described above.

The communication unit 501 transmits and receives the radio signal via the antenna device 100. For example, the communication unit 501 may transmit the radio signal (uplink signal) to the base station 300. Further, the communication unit 501 may receive the radio signal (downlink signal) from the base station 300.

The height detecting unit 503 detects the position of the communication device 500 (in particular, the antenna device 100) in the height direction, and notifies the control unit 507 of the detection results. The height detecting unit 503 may detect the position (absolute position) in the height direction, for example, using GPS or the like. Further, as another example, the height detecting unit 503 may detect a change in a position (relative position) in the height direction by monitoring a change in acceleration in the height direction by an acceleration sensor or the like. Of course, the above example is merely an example, and a method and a configuration there of are not particularly limited as long as it is possible to detect the position in the height direction of the antenna device 100.

The angle detecting unit 505 is constituted by an angle sensor or the like, and detects the angle of the inclination (that is, the posture) of the communication device 500 (in particular, the antenna device 100), and notifies the control unit 507 of the detection result. Further, the above example is only an example, and a method and a configuration thereof are not particularly limited as long as it is possible to detect the change in the angle of the inclination of the antenna device 100.

The control unit 507 acquires the detection result of the position of the communication device 500 (in particular, the antenna device 100) in the height direction from the height detecting unit 503. Further, the control unit 507 acquires the detection result of the posture of the communication device 500 (in particular, the antenna device 100) from the sensitivity detecting unit 505. The control unit 507 controls the operation of the communication unit 501 on the basis of the detection result of the position of the communication device 500 in the height direction and the detection result of the posture of the communication device 500 and controls the operation related to the transmission of the information (data) to the base station 300 (that is, the operation related to the transmission of the radio signal).

As a specific example, the control unit 507 may control the information to be transmitted to the base station 300 in a case in which the position of the communication device 500 in the height direction exceeds a threshold value.

Further, as another example, the control unit 507 may perform control such that the information is transmitted to the base station 300 at a timing at which the position of the communication device 500 in the height direction reaches a vertex in a situation in which the height of the communication device 500 changes due to the influence of waves. In this case, for example, in a case in which the position of the communication device 500 in the height direction changes upward, the control unit 507 may perform control such that the information is transmitted to the base station 300 at a timing in a case in which an upward change amount in the position becomes substantially equal to 0. Further, as another example, the control tool 507 may perform control such that the information is transmitted to the base station 300 at a timing at which the acceleration directed upward in the vertical direction of the communication device 500 switches from positive to negative.

Further, the control unit 507 may perform control such that the information is transmitted to the base station 300 in a case in which the angle of the inclination of the communication device 500 (in particular, the antenna device 100) is within a predetermined range (that is, within a range in which the gain is further improved in communication with the base station 500).

With the above control, the communication device 500 according to the third modified example can perform control such that the information is transmitted to the base station 300 under the condition that a better antenna characteristic is obtained in communication with the base station 300 (for example, the condition that the gain becomes higher).

As the third modified example, the example in which the communication device according to the present embodiment is applied to the sea buoy has been described with reference to FIGS. 19 to 21.

3.5. EVALUATION

As described above, the communication device 200 according to the present embodiment includes a housing including at least a long member in at least a part thereof, an antenna device, and a control unit that controls an operation related to transmission of a radio signal via an antenna device in accordance with a detection result of a posture of the housing (that is, a posture of the antenna device) by a predetermined detecting unit. More specifically, in the communication system according to the present embodiment, the communication device 200 is constituted by installing an antenna device for performing wireless communication for a stick-like instrument such as a cane used by a predetermined target person, a circuit for controlling communication via the antenna device (for example, a control unit), and the like. On the basis of such a configuration, the control unit may control the data serving as the transmission target, for example, in accordance with the detection result of the posture of the housing. Further, as another example, the control unit may control the transmission method of the radio signal (that is, transmission data) such as transmission power of the radio signal, a communication channel (that is, the radio frequency) for transmitting the radio signal, a modulation method of the transmission data, and an error correction code rate of the transmission data on the basis of the detection result of the posture of the housing.

With the above configuration, according to the communication system of the present embodiment, even in a situation in which a predetermined target person moves, in a case in which it is estimated that a certain abnormality occurs in the target person regardless of the position of the communication device 200 (eventually, the position of the target person who is the user of the communication device 200), it is possible to transmit the information (data) indicating the abnormality to other devices via the wireless communication path. Accordingly, the users of other devices (for example, the persons related to the target person) can recognize that a certain abnormality occurs in the target person on the basis of the information transmitted from the communication device 200.

Further, according to the communication system of the present embodiment, in a case in which it is estimated that a certain abnormality occurs in the target person, it is possible to reliably deliver the information indicating the abnormality to other devices serving as the transmission destination by controlling the transmission method of the radio signal (that is, the transmission data). As a more specific example, it is possible to expect long distance wireless communication, low power consumption radio signal transmission, improvement of a packet error rate (PER), and the like in accordance with the control of the communication method.

4. EXAMPLE OF HARDWARE CONFIGURATION

Figure 22:
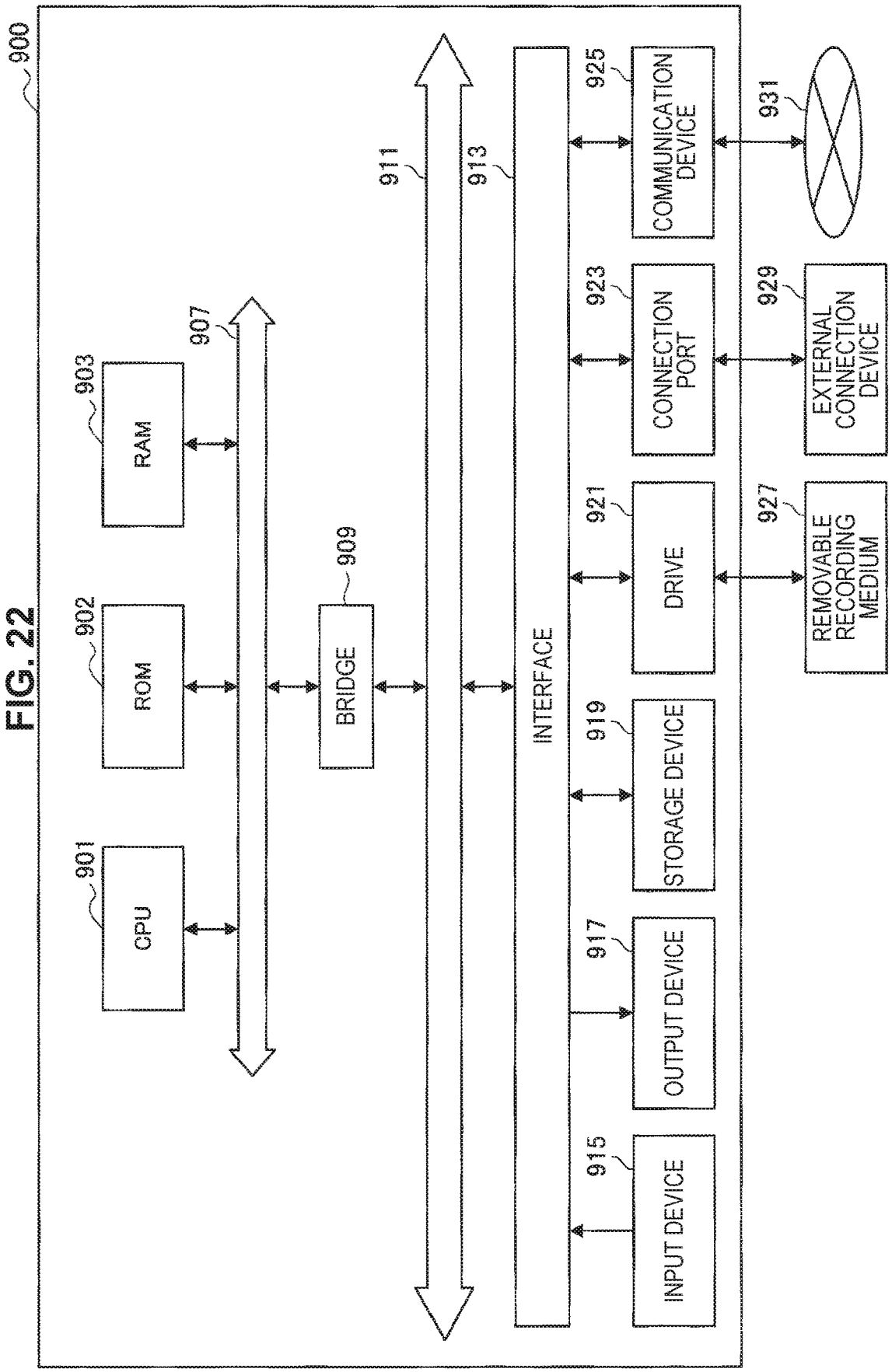
FIG. 22 is a functional block diagram illustrating a configuration example of a hardware configuration of an information processing device according to an embodiment of the present disclosure.

Next, like the communication device 200 or the information processing device 350 described above, an example of a hardware configuration of an information processing device included in the communication system according to an embodiment of the present disclosure will be described in detail with reference to FIG. 22. FIG. 22 is a function block diagram illustrating an example of the hardware configuration of the information processing device included in the communication system according to the present embodiment of the present disclosure.

The information processing device 900 included in the communication system according to the present embodiment mainly includes a CPU 901, a ROM 903, and a RAM 905. Furthermore, the information processing device 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. The control unit 211 described with reference to FIG. 15 can include the CPU 901, for example.

The host bus 907 is connected to the external bus 911 such as a peripheral component interconnect/interface) (PCI) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 900. Furthermore, the input device 915 generates an input signal based on, for example, information which is input by a user with the above operation mechanism, and includes an input control circuit for outputting the input signal to the CPU 901. The user of the information processing device 900 can input various data to the information processing device 900 and can instruct the information processing device 900 to perform processing by operating the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 900. More specifically, the display device displays, in the form of texts or images, a result obtained by various processes performed by the information processing device 900. On the other hand, the audio output device converts an audio signal including reproduced audio data and sound data into an analog signal, and outputs the analog signal.

The storage device 919 is a device for storing data configured as an example of a storage unit of the information processing device 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, and various data.

The drive 921 is a reader/writer for recording medium, and is embedded in the information processing device 900 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, a secure digital (SD) memory card, or the like. Alternatively, the removable recording medium 927 may be, for example, an integrated circuit (IC) card equipped with a non-contact IC chip or an electronic appliance.

The connection port 923 is a port for allowing devices to directly connect to the information processing device 900. Examples of the connection port 923 include a universal serial bus (USB) port, an IEEE1394 port, a small computer system interface (SCSI) port, and the like. Other examples of the connection port 923 include an RS-232C port, an optical audio terminal, a high-definition multimedia interface (HDMI) (a registered trademark) port, and the like. By the external connection device 929 connecting to this connection port 923, the information processing device 900 directly obtains various types of data from the external connection device 929 and provides various types of data to the external connection device 929.

The communication device 925 is a communication interface including, for example, a communication device for connecting to a communication network 931. The communication device 925 is, for example, a wired or wireless local area network (LAN), Bluetooth (registered trademark), a communication card for WUSB (Wireless USB), or the like. Alternatively, the communication device 925 may be a router for optical communication, a router for asymmetric digital subscriber line (ADSL), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like. The communication control unit 217 and the antenna device 100 described with reference to FIG. 15 can include the communication device 925, for example.

Heretofore, an example of the hardware configuration capable of realizing the functions of the information processing device 900 included in the communication system according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 22, for example, it naturally includes various configurations corresponding to the information processing device 900 included in the communication system.

Note that it is also possible to develop a computer program for realizing the respective functions of the information processing device 900 included in the communication system according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (e.g., a plurality of servers or the like).

5. CONCLUSION

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An antenna device, including:
an antenna element constituted by a conductor, having a tubular shape, and including a long notch section formed to extend in an axial direction in at least a part of a side surface;
a capacitor formed to bridge end portions of the notch section in a short direction, substantially at a center of the notch section in a longitudinal direction; and
a power feed point formed at a position which is apart from the capacitor to a side of one end portion of the notch section in the longitudinal direction and corresponds to a side of one end portion of the notch section in the short direction.

(2)
The antenna device according to (1), in which the antenna element has a cylindrical shape elongated in the axial direction.

(3)
The antenna device according to (1) or (2), including:
a second capacitor formed to bridge the end portions of the notch section in the short direction, substantially at a center between the capacitor which is a first capacitor and one end portion of the notch section in the longitudinal direction; and
a second power feed point, different from the power feed point which is a first power feed point, formed at a position which is apart from the second capacitor to a side of one end portion of the notch section in the longitudinal direction positioned on a side opposite to the first capacitor and corresponds to a side of one end portion of the notch section in the short direction.

(4)
The antenna device according to (3), in which the second capacitor is positioned on a side opposite to the first power feed point in the longitudinal direction of the notch section with respect to the first capacitor, and
the second power feed point is positioned on a side opposite to the first capacitor in the longitudinal direction of the notch section with respect to the second capacitor.

(5)
A communication device, including:
a housing including a long member in at least a part;
an antenna device; and
a control unit configured to control an operation related to transmission of a radio signal via the antenna device in accordance with a detection result of a posture of the housing by a predetermined detecting unit.

(6)
The communication device according to (5), in which the antenna device includes
an antenna element constituted by a conductor, having a tubular shape, and including a long notch section formed to extend in an axial direction in at least a part of a side surface,
a capacitor formed to bridge end portions of the notch section in a short direction, substantially at a center of the notch section in a longitudinal direction, and
a power feed point formed at a position which is apart from the capacitor to a side of one end portion of the notch section in the longitudinal direction and corresponds to a side of one end portion of the notch section in the short direction.

(7)
The communication device according to (5) or (6), in which at least a part of the long member is configured as the antenna device.

(8)
The communication device according to any one of (5) to (7), in which the control unit controls the operation related to the transmission of the radio signal in accordance with a detection result of a posture of the housing and a detection result of a position of the communication device by a predetermined detecting unit.

(9)
The communication device according to (8), in which the control unit controls the operation related to the transmission of the radio signal depending on whether or not the detection result of the position of the communication device is within a predetermined region.

(10)
The communication device according to any one of (5) to (9), in which the control unit controls transmission power of the radio signal via the antenna device as the control of the operation related to the transmission of the radio signal.

(11)
The communication device according to any one of (5) to (10), including
a second antenna device different from the antenna device which is a first antenna device,
in which the control unit switches an antenna device to transmit the radio signal between the first antenna device and the second antenna device as the control of the operation related to the transmission of the radio signal.

(12)
The communication device according to (11), in which the second antenna device has a different polarization direction of the radio signal relative to the first antenna device.

(13)
The communication device according to any one of (5) to (12), in which the control unit controls a radio frequency for transmitting the radio signal as the control of the operation related to the transmission of the radio signal.

(14)
The communication device according to any one of (5) to (13), in which the control unit controls a modulation method of a signal to be transmitted as the radio signal as the control of the operation related to the transmission of the radio signal.

(15)
The communication device according to any one of (5) to (14), in which the control unit controls an encoding method of data serving as a transmission target as the control of the operation related to the transmission of the radio signal.

(16)
The communication device according to any one of (5) to (15), in which the control unit controls data serving as a transmission target as the control of the operation related to the transmission of the radio signal.

(17)
A communication method, including:
controlling, in a communication device including a housing including a long member in at least a part and an antenna device, an operation related to transmission of a radio signal in accordance with a detection result of a posture of the housing by a predetermined detecting unit; and
transmitting the radio signal via the antenna device.

REFERENCE SIGNS LIST 1 communication system
100 antenna device
101 antenna element
103 notch section
105a, 105b power feed line
107 member
111a, 111b capacitor
113a, 113b power feed point
200 communication device
210 circuit unit
211 control unit
213 position detecting unit
215 angle detecting unit
217 communication control unit
231 switching unit
280 power supply unit
291 grip section
293 shaft section
300 base station
350 information processing device

The invention claimed is:
1. An antenna device, comprising:
an antenna element that includes:
a conductor; and
a notch section that extends in an axial direction of the antenna device, wherein
the antenna element has a tubular shape, and
the notch section is on a side surface of the antenna device;
a first capacitor between a first end portion and a second end portion of the notch section, wherein
the first end portion and the second end portion of the notch section are in a short direction of the notch section,
the short direction is shorter than a longitudinal direction of the notch section, and
the first capacitor is substantially at a centre of the notch section in the longitudinal direction; and
a first power feed point at a first position which is spaced apart from entire of the first capacitor, wherein
the first power feed point is at a side of a third end portion of the notch section,
the third end portion of the notch section is in the longitudinal direction, and
the first power feed point corresponds to a side of one of the first end portion or the second end portion of the notch section in the short direction.

2. The antenna device according to claim 1, wherein the antenna element has a cylindrical shape elongated in the axial direction.

3. The antenna device according to claim 1, further comprising:
a second capacitor between the first end portion and the second end portion of the notch section in the short direction, wherein
the second capacitor is substantially at a centre between the first capacitor and a fourth end portion of the notch section, and
the fourth end portion of the notch section is in the longitudinal direction; and
a second power feed point different from the first power feed point, wherein
the second power feed point is at a second position spaced apart from the second capacitor,
the second power feed point is at a side of the fourth end portion of the notch section in the longitudinal direction,
the side of the fourth end portion of the notch section is opposite to the first capacitor, and
the second power feed point corresponds to the side of the one of the first end portion or the second end portion of the notch section in the short direction.

4. The antenna device according to claim 3, wherein
the second capacitor is opposite to the side of the third end portion of the notch section, in the longitudinal direction, with respect to the first capacitor, and
the second power feed point, at the side of the fourth end portion of the notch section, is opposite to the first capacitor in the longitudinal direction of the notch section with respect to the second capacitor.

* * * * *